US011926156B2

(12) United States Patent
Kimoto

(10) Patent No.: US 11,926,156 B2
(45) Date of Patent: Mar. 12, 2024

(54) THERMAL PRINT HEAD AND METHOD OF FABRICATING THEREOF

(71) Applicant: ROHM CO., LTD., Kyoto (JP)

(72) Inventor: Satoshi Kimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 192 days.

(21) Appl. No.: 17/723,073

(22) Filed: Apr. 18, 2022

(65) Prior Publication Data

US 2022/0332112 A1 Oct. 20, 2022

(30) Foreign Application Priority Data

Apr. 20, 2021 (JP) ................................ 2021-071107

(51) Int. Cl.
*B41J 2/14* (2006.01)
*B41J 2/16* (2006.01)

(52) U.S. Cl.
CPC ......... *B41J 2/14129* (2013.01); *B41J 2/1601* (2013.01); *B41J 2/1626* (2013.01)

(58) Field of Classification Search
CPC .... B41J 2/1601; B41J 2/14129; B41J 2/1626; B41J 2/33505; B41J 2/3352; B41J 2/3357; B41J 2/3354; B41J 2/335; B41J 2/3359
See application file for complete search history.

(56) References Cited

U.S. PATENT DOCUMENTS

2014/0333708 A1* 11/2014 Ochi ...................... B41J 2/3357
347/203

FOREIGN PATENT DOCUMENTS

JP 2019166824 A 10/2019

* cited by examiner

*Primary Examiner* — Thinh H Nguyen
(74) *Attorney, Agent, or Firm* — HAMRE, SCHUMANN, MUELLER & LARSON, P.C.

(57) ABSTRACT

The present disclosure provides a thermal print head and a method of fabricating the thermal print head. The thermal print head includes a substrate made of a semiconductor material and having a main surface and a convex portion, a resistor layer including a plurality of heat generating portions on the convex portion, and a wiring layer conducted to the plurality of heat generating portions and formed to contact the resistor layer. The convex portion has a top surface, a first inclined surface and a second inclined surface. At least one of two ends of the convex portion in the main scanning direction forms a third inclined surface connected to the main surface and the first inclined surface, and a fourth inclined surface connected to the main surface and the second inclined surface.

20 Claims, 22 Drawing Sheets

THERMAL PRINT HEAD AND METHOD OF FABRICATING THEREOF

TECHNICAL FIELD

The present disclosure relates to a thermal print head and a method of fabricating thereof.

BACKGROUND

Patent publication 1 disclosed a thermal print head made of a silicon-containing material. A substrate of the thermal print head has a main surface, and a convex portion extending in a main scanning direction and protruding from the main surface. As shown in FIG. 6 of patent publication 1, plurality of heat generating portions are arranged on the convex portion in the main scanning direction. According to the configuration above, a printing medium is enabled to reliably come into contact with the convex portion arranged with the plurality of heat generating portions, thereby achieving enhanced printing quality as anticipated. Thus, the substrate of the thermal print head features advantages of higher heat conductivity and lower costs than a substrate made of a material containing aluminum nitride. However, in the thermal print head, an end surface of the convex portion located at an end in the main scanning direction of the convex portion erects steeply from the main surface. As a result, the end of the convex portion in the main scanning direction becomes sharp. Due to the sharp end, there is a concern of damage of the recording medium, and improvement needs to be made.

PRIOR ART DOCUMENT

[Patent publication]

[Patent document 1] Japan Patent Publication No. 2019-166824

SUMMARY OF THE PRESENT DISCLOSURE

Problems to be Solved by the Present Disclosure

In view of the situation above, it is a task of the present disclosure to provide a thermal print head and a method of fabricating thereof capable of inhibiting sharpening of an end of a convex portion of a substrate in a main scanning direction.

Technical Means for Solving the Problem

According to a first aspect of the present disclosure, a thermal print head includes: a substrate, made of a semiconductor material, and having a main surface facing a thickness direction and a convex portion protruding from the main surface and extending in a main scanning direction; a resistor layer, including a plurality of heat generating portions arranged in the main scanning direction and located on the convex portion; and a wiring layer, conducted to the plurality of heat generating portions and formed to contact the resistor layer. The convex portion includes: a top surface, facing the thickness direction and located away from the main surface; and a first inclined surface and a second inclined surface that are connected to the main surface, located away from each other in a sub scanning direction, and inclined with respect to the main surface; wherein at least one of two ends of the convex portion in the main scanning direction forms a third inclined surface connected to the main surface and the first inclined surface, and a fourth inclined surface connected to the main surface and the second inclined surface, and wherein the third inclined surface is inclined with respect to the main surface and the first inclined surface and the fourth inclined surface is inclined with respect to the main surface and the second inclined surface.

According to a second aspect of the present disclosure, a method of fabricating a thermal print head includes: forming a mask layer on a first surface and a second surface of a substrate made of a semiconductor material, wherein the first surface and the second surface face opposite sides of each other in a thickness direction; forming a main surface and a convex portion on the substrate by an anisotropic etching, wherein the main surface faces a same direction as the first surface in the thickness direction and is located between the first surface and the second surface, and the convex portion protrudes from the main surface; removing the mask layer; forming a resistor layer including a plurality of heat generating portions arranged in a main scanning direction and on the convex portion; and forming a wiring layer conducting the plurality of heat generating portions and in contact with the resistor layer, wherein the mask layer includes a first mask layer formed on the first surface and a second mask layer formed on the second surface. The first mask layer includes: a covering portion, extending in the main scanning direction and covering the first surface; two first openings, located in the sub scanning direction with the covering portion disposed in between, and extending in the main scanning direction; and a second opening, located next to an end of the covering portion in the main scanning direction, and connected to the two first openings, wherein the first surface is exposed from the two first openings and the second opening.

Effects of the Present Disclosure

The thermal print head and the method of fabricating thereof according to the present disclosure are capable of inhibiting sharpening of an end of a convex portion of a substrate in a main scanning direction.

Other features and advantages of the present disclosure will become more readily apparent with the detailed description given on the basis of the accompanying drawings below.

DETAILED DESCRIPTION OF THE EMBODIMENTS

Implementation details of the present disclosure are described on the basis of the accompanying drawings below.

First Embodiment

Figure 2:
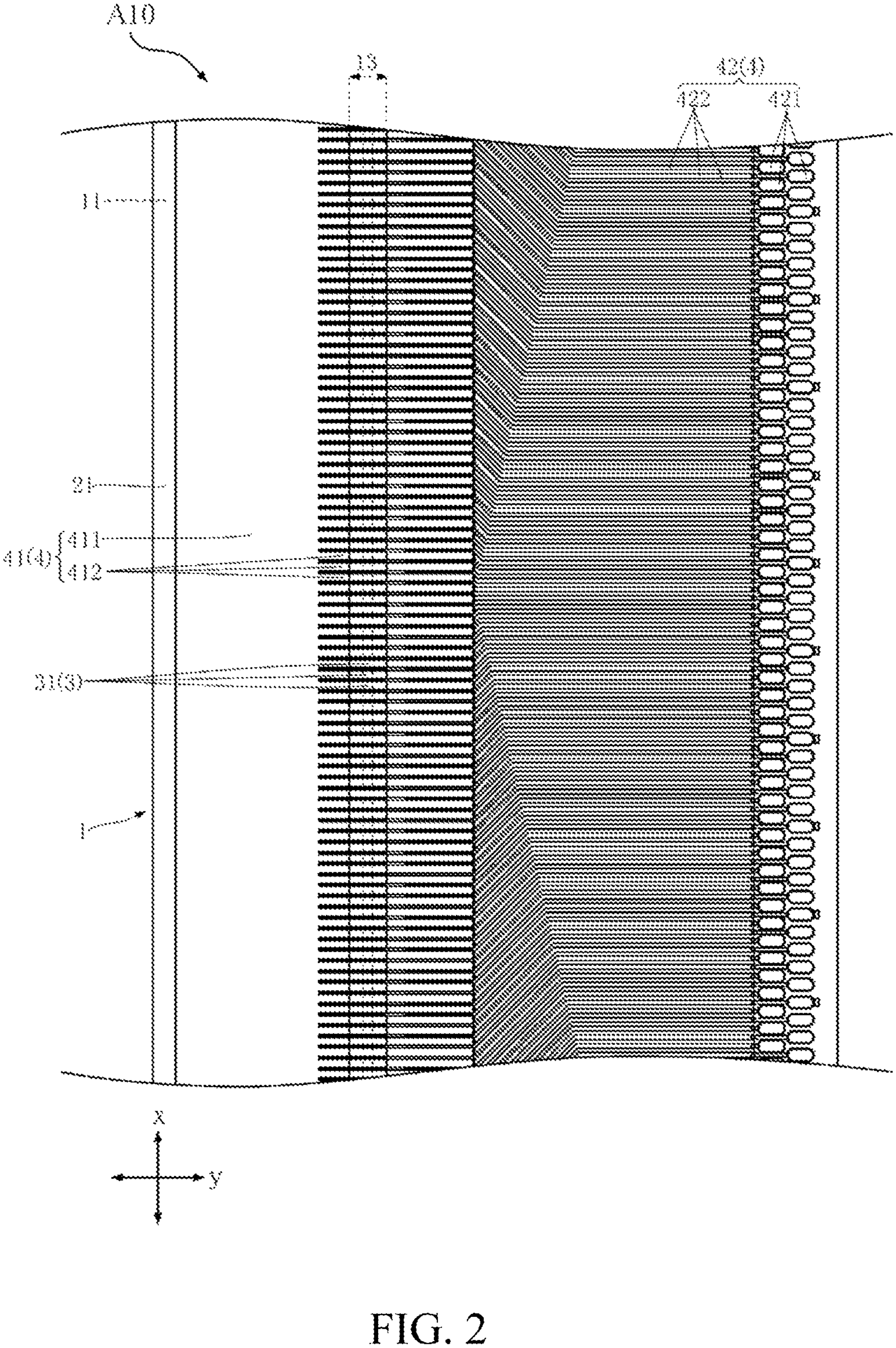
FIG. 2 is a top view of a main part of the thermal print head in FIG. 1.
Figure 3:
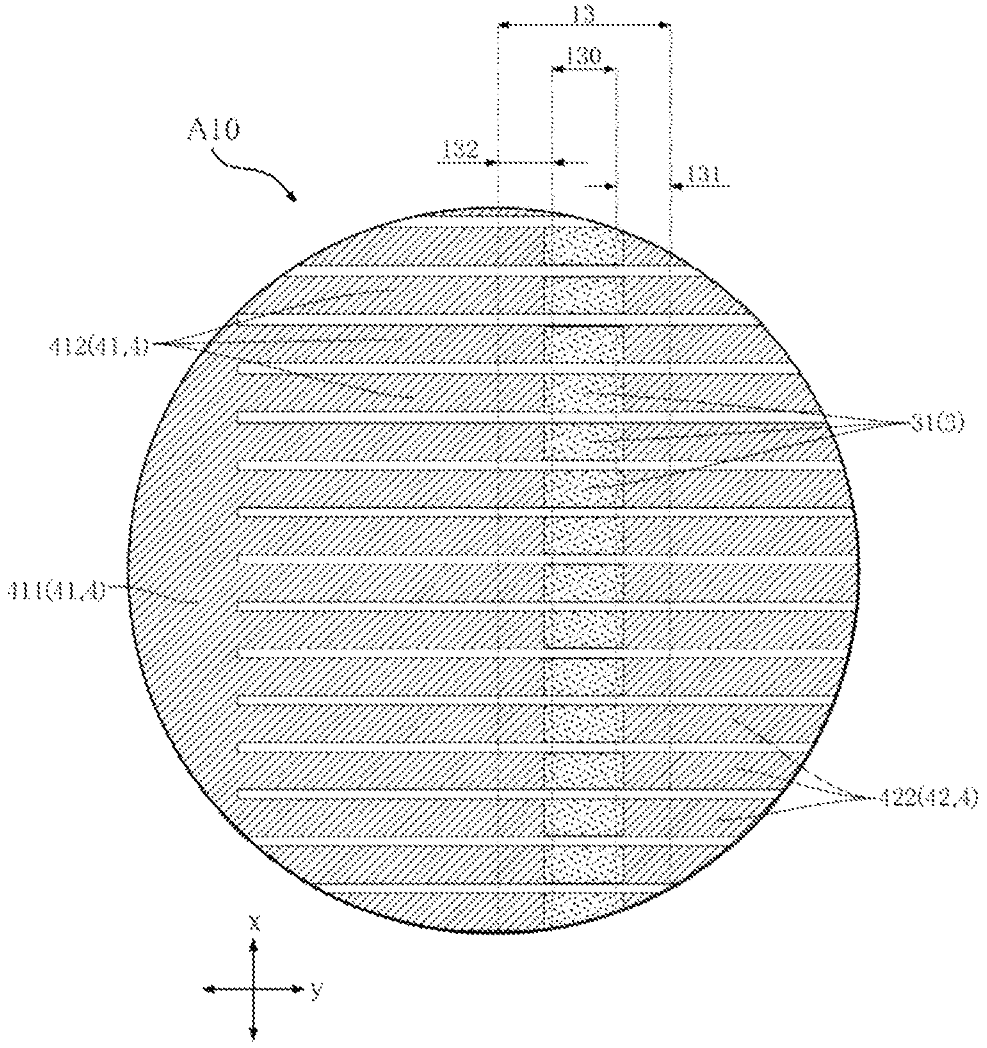
FIG. 3 is an enlarged partial view of FIG. 2.

On the basis of FIG. 1 to FIG. 11, a thermal print head A10 according to a first embodiment of the present disclosure is described below. The thermal print head A10 forms the main part of a thermal printer B10 to be described below. The thermal print head A10 includes a main part and an accompanying part. The main part of the thermal print head A10 includes a substrate 1, an insulating layer 21, a resistor layer 3, a wiring layer 4 and a protective layer 5. The accompanying part of the thermal print head A10 includes a wiring substrate 71, a heat dissipation member 72, multiple driving elements 73, multiple first conducting wires 74, multiple second conducting wires 75, a sealing resin 76 and a connector 77. Further, in FIG. 1, for better understanding, observation is made through the protective layer 5, and the multiple first conducting wires 74, the multiple second conducting wires 75 and the sealing resin 76 are omitted. In FIG. 2 and FIG. 3, for better understanding, observation is made through the protective layer 5.

Further, for better illustration, a main scanning direction of the thermal print head A10 is referred to as the "x direction", a sub scanning direction of the thermal print head A10 is referred to as the "y direction", and the thickness direction of the substrate 1 is referred to as the "z direction". The z direction is perpendicular to both the x direction and the y direction. In the description below, "observed in the z direction" means "observed in the thickness direction."

Figure 4:
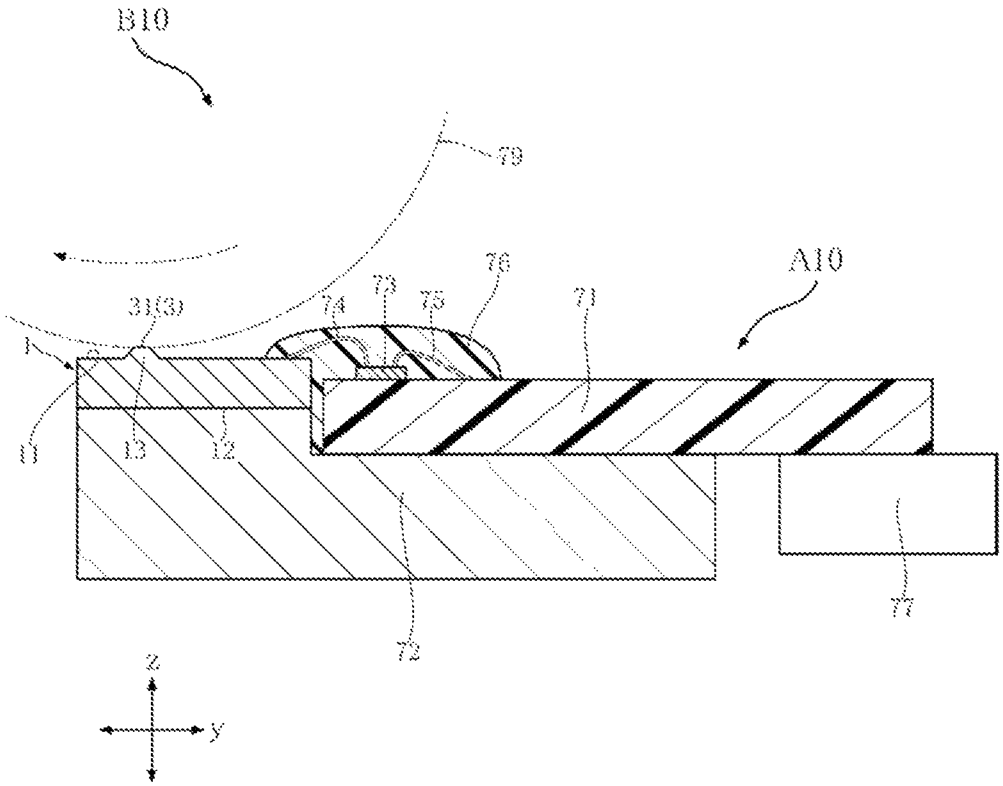
FIG. 4 is a section diagram along a section line IV-IV in FIG. 1.

In the thermal print head A10, as shown in FIG. 4, the substrate 1 forming the main part of the thermal print head A10 is joined with the heat dissipation member 72. Further, the wiring substrate 71 is located next to the substrate 1 in the y direction. The wiring substrate 71, similar to the substrate 1, is fixed on the heat dissipation member 72. A plurality of heat generating portions 31 are formed on the substrate 1 (with details to be described below), and these heat generating portions 31 form a part of the resistor layer 3 and are arranged in the x direction. The plurality of heat generating portions 31 selectively generate heat through multiple driving elements 73 mounted on the wiring substrate 71. The multiple driving elements 73 perform driving according to a printing signal sent from the exterior through the connector 77.

Further, as shown in FIG. 4, the thermal printer B10 of the present disclosure includes the thermal print head A10 and a pressure roller 79. In the thermal printer B10, the pressure roller 79 is a roller mechanism that transports a recording medium such as thermal paper. The recording medium is pressed against the plurality of heat generating portions 31 by the pressure roller 79, and the plurality of heat generating portions 31 perform printing on the recording medium. In the thermal printer B10, a non-roller mechanism may be used in substitution for the pressure roller 79. The mechanism has a flat surface. Moreover, the flat surface has a curve surface with a smaller curvature. In thermal printer B10, a roller mechanism such as the pressure roller 79 and the mechanism are included, and are referred to as a "platen". For better illustration, a supply side (the right of FIG. 4) of the recording medium in FIG. 4 is referred to as an "upstream side", and a discharge side (the left of FIG. 4) of the recording medium in FIG. 4 is referred to as a "downstream side".

Figure 1:
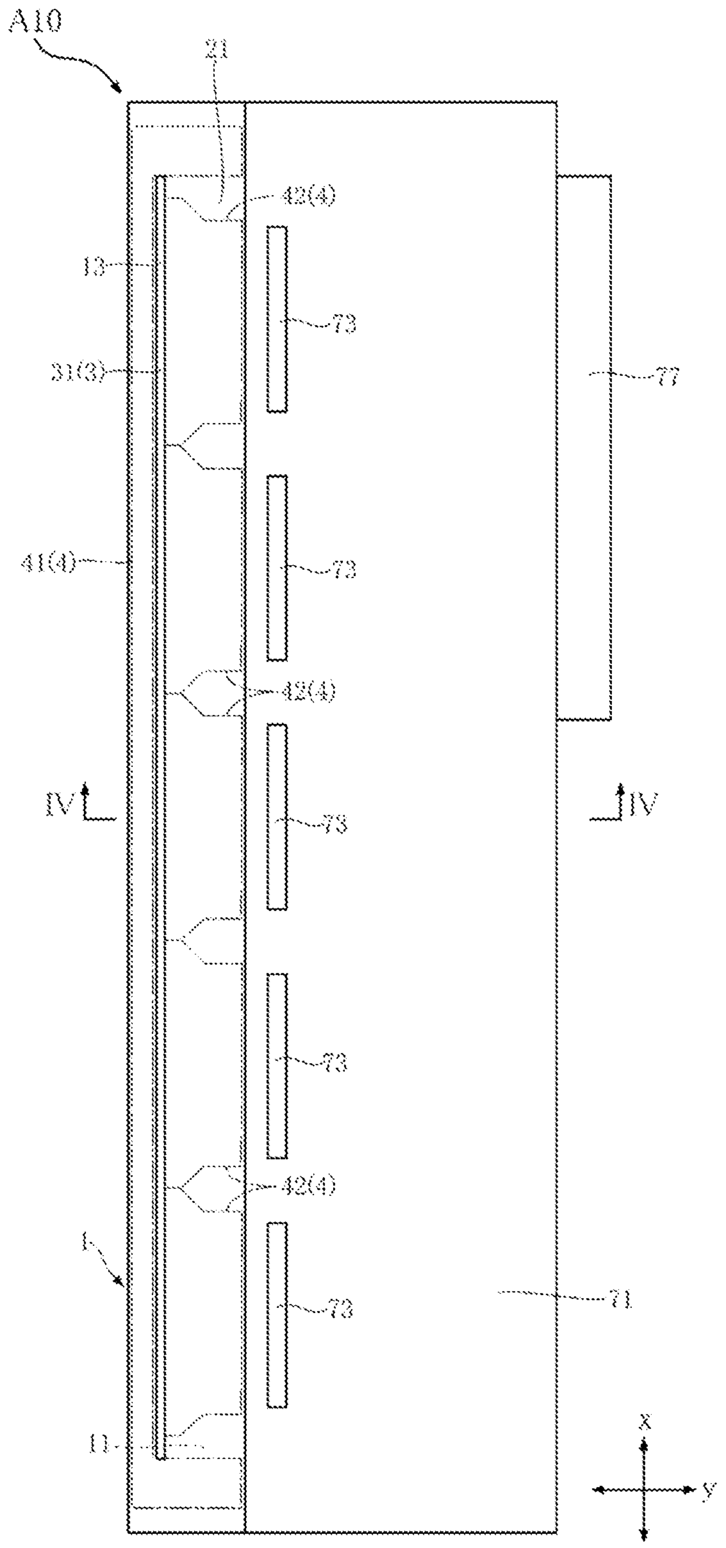
FIG. 1 is a top view of a thermal print head according to a first embodiment of the present disclosure and observed through a protective layer.

As shown in FIG. 1, the substrate 1 is a rectangle extending in the x direction when observed in the z direction. Thus, the x direction is equivalent to a long-side direction of the substrate 1, and they direction is equivalent to a short-side direction of the substrate 1. The substrate 1 is made of a semiconductor material. The semiconductor material includes a monocrystalline material consisting of silicon.

Figure 5:
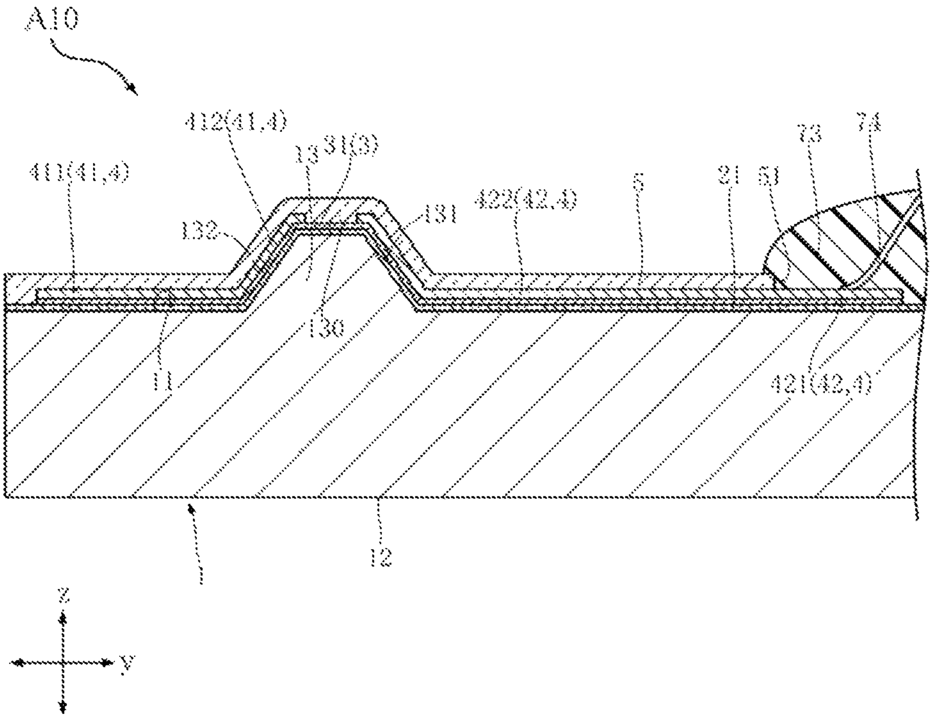
FIG. 5 is a section diagram of the main part of the thermal print head in FIG. 1.

As shown in FIG. 5, the substrate 1 has a main surface 11 and a back surface 12 facing opposite sides from each other in the z direction. The surface orientations of the main surface 11 and the back surface 12 of the crystalline structure based on the substrate 1 are both (100) surfaces. As shown in FIG. 4, in the thermal print head A10, the main surface 11 faces the pressure roller 79, and the back surface 12 faces the wiring substrate 71.

As shown in FIG. 5, the substrate 1 has a convex portion 13. The convex portion 13 protrudes toward the z direction from the main surface 11. As shown in FIG. 1 and FIG. 2, the convex portion 13 extends in the x direction.

Figure 6:
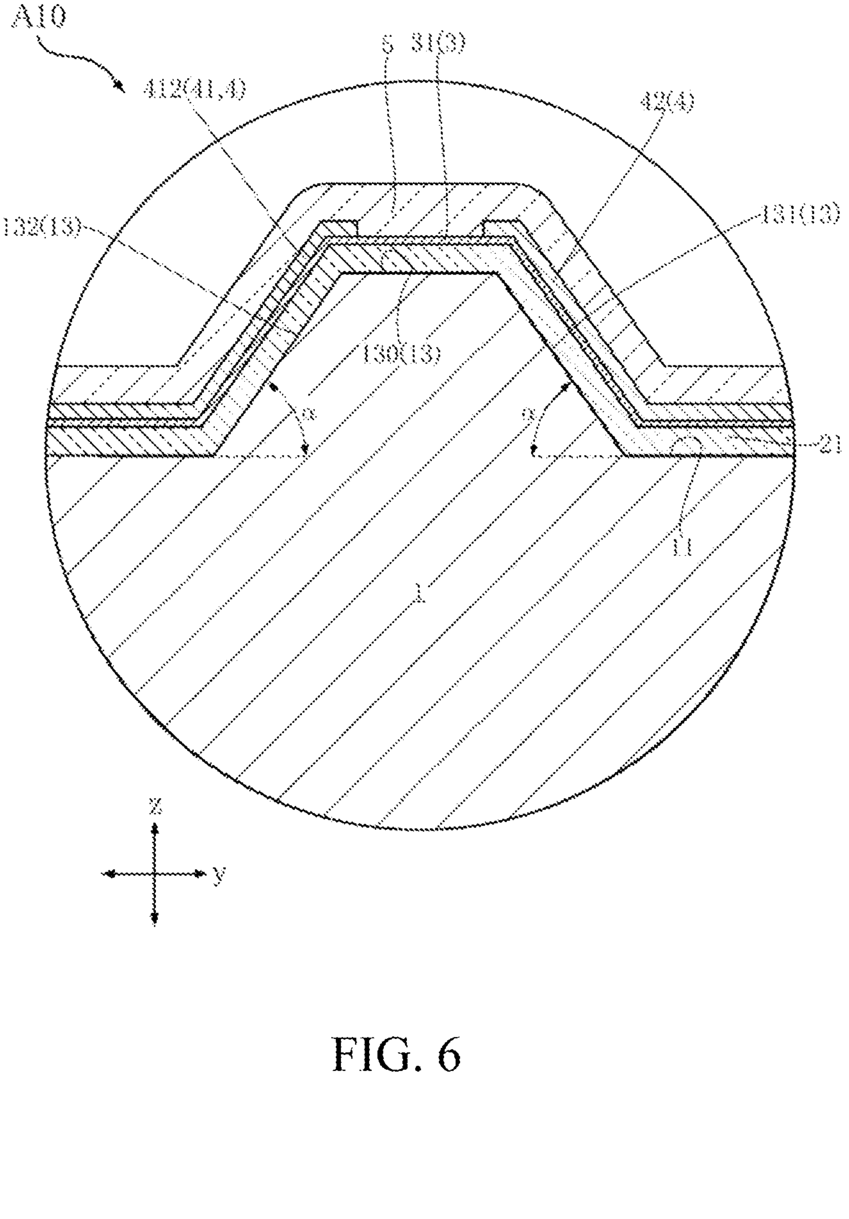
FIG. 6 is an enlarged partial view of FIG. 5.

As shown in FIG. 5 and FIG. 6, the convex portion 13 has the top surface 130, the first inclined surface 131 and the second inclined surface 132. The top surface 130, the first inclined surface 131 and the second inclined surface 132 extend in the x direction. The top surface 130 faces the z direction and is located away from the main surface 11. The top surface 130 is parallel to the main surface 11. The first inclined surface 131 and the second inclined surface 132 are connected to the main surface 11 and the top surface 130. The first inclined surface 131 and the second inclined surface 132 are located away from each other in they direction. The first inclined surface 131 is located on the upstream side. The second inclined surface 132 is located on the downstream side. The first inclined surface 131 and the second inclined surface 132 are inclined with respect to the main surface 11. The first inclined surface 131 and the second inclined surface 132 become closer to each other toward the top surface 130 from the main surface 11. Respective inclination angles α of the first inclined surface 131 and the second inclined surface 132 with respect to the main surface 11 are equal.

Figure 7:
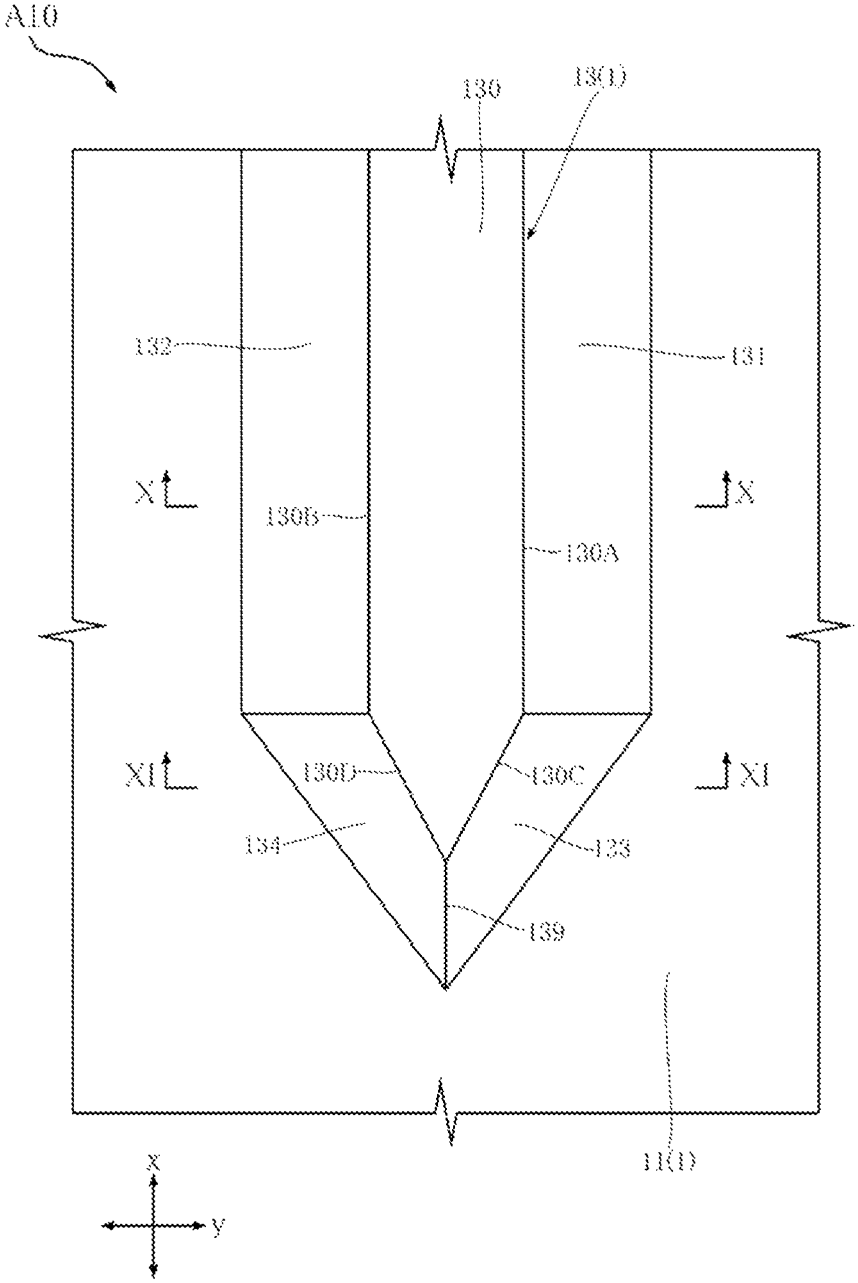
FIG. 7 is an enlarged partial view of FIG. 1, and observed further through an insulating layer, a resistor layer and a wiring layer.

As shown in FIG. 7, at least one of two ends of the convex portion 13 in the x direction forms a third inclined surface 133 and a fourth inclined surface 134. In the thermal print head A10, the third inclined surface 133 and the fourth inclined surface 134 form at each of the two ends. The third inclined surface 133 is connected to the main surface 11, the first inclined surface 131 and the top surface 130. The third inclined surface 133 is inclined with respect to the main surface 11, the first inclined surface 131 and the top surface 130. An area of the third inclined surface 133 is less than an area of the first inclined surface 131. The fourth inclined surface 134 is connected to the main surface 11, the second inclined surface 132 and the top surface 130. The fourth inclined surface 134 is inclined with respect to the main surface 11, the second inclined surface 132 and the top surface 130. An area of the fourth inclined surface 134 is less than an area of the second inclined surface 132.

Figure 11:
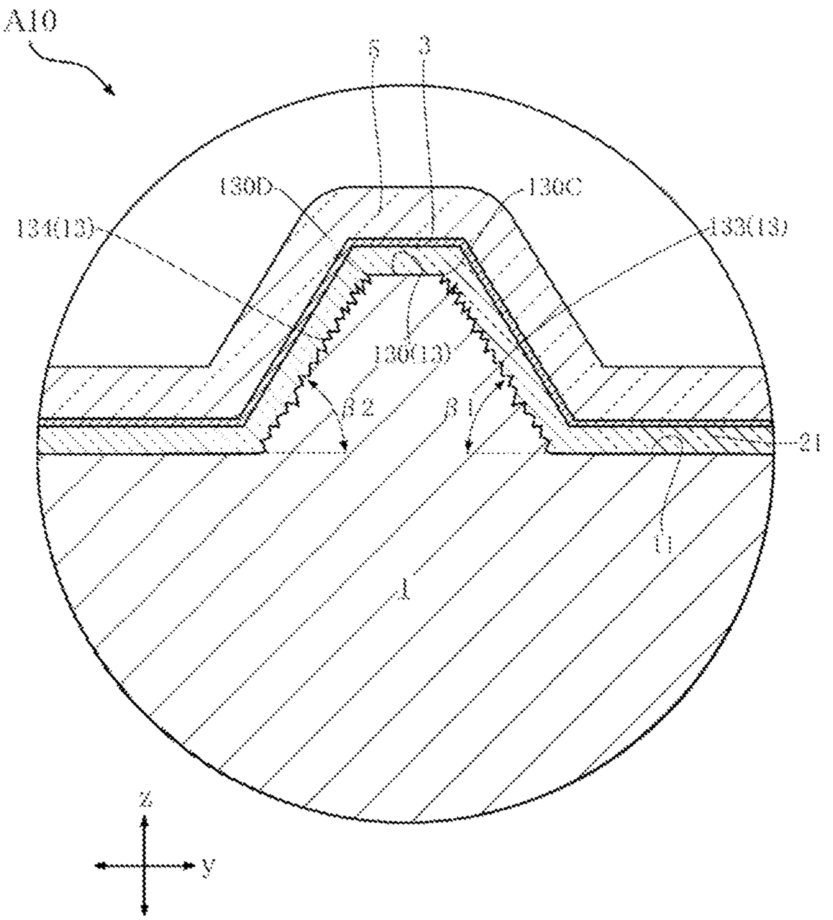
FIG. 11 is a section diagram along a section line XI-XI in FIG. 7.

As shown in FIG. 11, the third inclined surface 133 and the fourth inclined surface 134 become closer to each other toward the top surface 130 from the main surface 11. An inclination angle β1 of the third inclined surface 133 with respect to the main surface 11 and an inclination angle β2 of the fourth inclined surface 134 with respect to the main surface 11 are greater than the inclination angle α.

Figure 10:
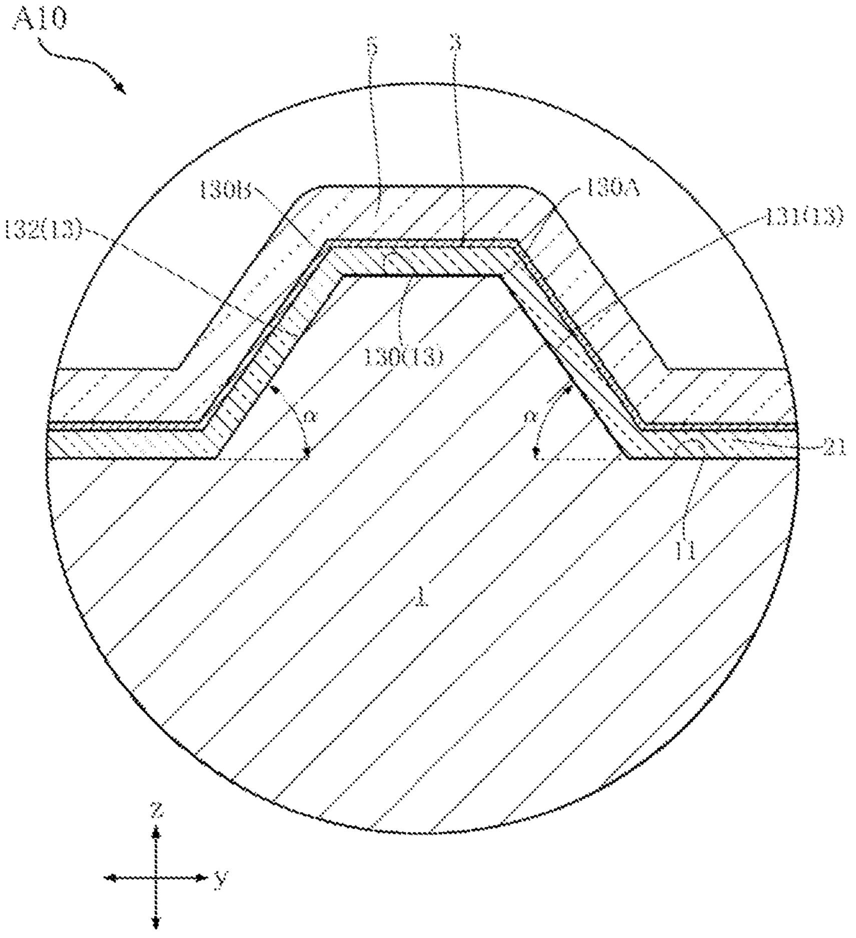
FIG. 10 is a section diagram along a section line X-X in FIG. 7.

As shown in FIG. 10 and FIG. 11, a surface roughness of the third inclined surface 133 is greater than a surface roughness of the first inclined surface 131, and a surface roughness of the fourth inclined surface 134 is greater than a surface roughness of the second inclined surface 132.

As shown in FIG. 7, a peripheral edge of the top surface 130 includes a first edge 130A, a second edge 130B, a third edge 130C and a fourth edge 130D. The first edge 130A forms a boundary between the top surface 130 and the first inclined surface 131. The second edge 130B forms a boundary between the top surface 130 and the second inclined surface 132. The second inclined surface 132 is parallel to the first inclined surface 131. The third edge 130C is connected to the first edge 130A, and forms a boundary with the third inclined surface 133. The third inclined surface 133 is inclined with relative to the first edge 130A in the x direction. The fourth edge 130D is connected to the second edge 130B, and forms a boundary with the fourth inclined surface 134. The fourth inclined surface 134 is inclined with relative to the second edge 130B in the x direction.

As shown in FIG. 7, the third edge 130C and the fourth edge 130D of the top surface 130 become close to each other when being separated from the first edge 130A and the second edge 130B of the top surface 130 in the x direction. An end of the third edge 130C located on the opposite side from the first edge 130A and an end of the fourth edge 130D located on the opposite side from the second edge 130B are connected to each other.

Figure 8:
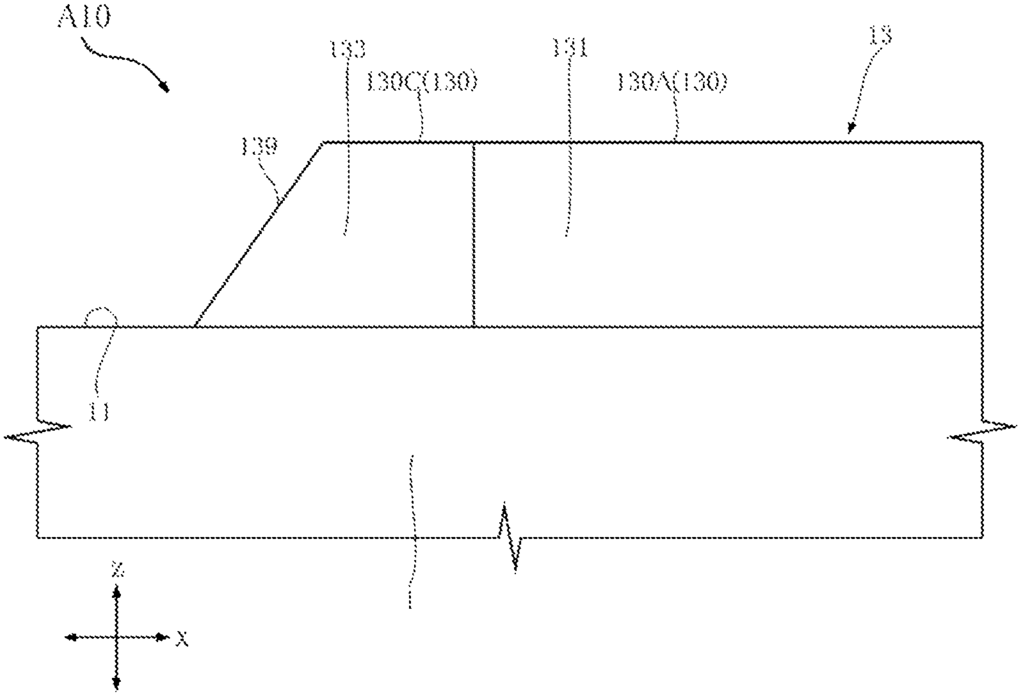
FIG. 8 is a right side view corresponding to FIG. 7.
Figure 9:
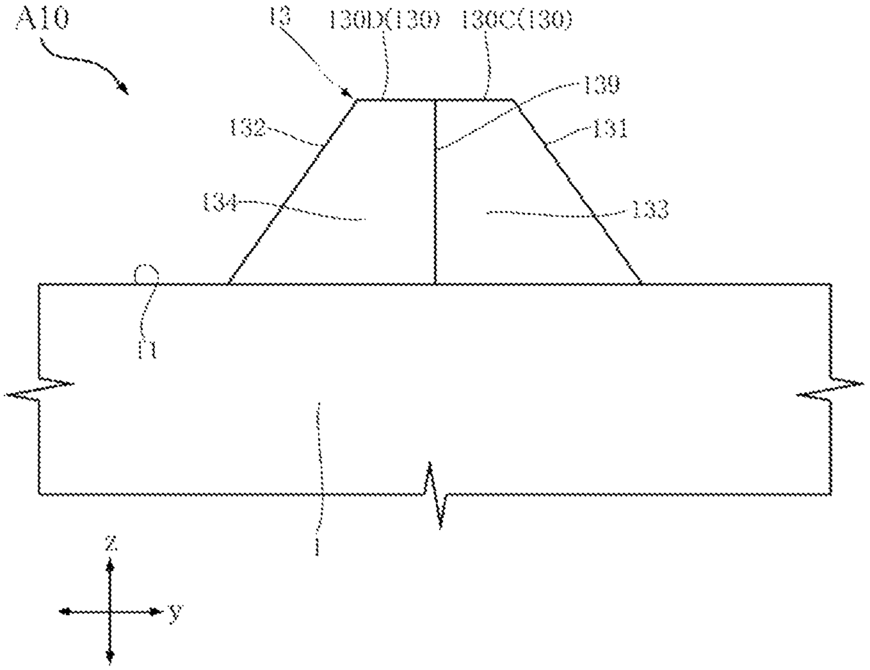
FIG. 9 is a front view corresponding to FIG. 7.

As shown in FIG. 7 and FIG. 9, the third inclined surface 133 and the fourth inclined surface 134 are connected to each other in the y direction. As shown in FIG. 8, a ridge line 139 forming a boundary between the third inclined surface 133 and the fourth inclined surface 134 is inclined with respect to the main surface 11. As shown in FIG. 7, when observed in the z direction, the ridge line 139 is closer to outside in the x direction with respect to the top surface 130.

As shown in FIG. 5 and FIG. 6, the insulating layer 21 covers the main surface 11 and the convex portion 13 of the substrate 1. With the insulating layer 21, the substrate 1 is electrically insulated from the resistor layer 3 and the wiring layer 4. The insulating layer 21 includes, for example, silicon dioxide ($SiO_2$) with tetraethyl orthosilicate (TEOS) as the raw material. A thickness of the insulating layer 21 is, for example, 1 μm or more and 15 μm or less.

As shown in FIG. 5 and FIG. 6, the resistor layer 3 is formed on the main surface 11 and the convex portion 13 of the substrate 1. The resistor layer 3 is connected to the insulating layer 21. Thus, in the thermal print head A10, the insulating layer 21 is sandwiched between the substrate 1 and the resistor layer 3. The resistor layer 3 includes, for example, tantalum nitride (TaN). A thickness of the resistor layer 3 is, for example, 0.02 μm or more and 0.1 μm or less.

As shown in FIG. 2, FIG. 3 and FIG. 6, the resistor layer 3 includes the plurality of heat generating portions 31. In the resistor layer 3, the plurality of heat generating portions 31 are parts exposed from the wiring layer 4. The plurality of heat generating portions 31 are selectively energized via the wiring layer 4, so that the plurality of heat generating portions 31 partially heat the recording medium. The plurality of heat generating portions 31 are arranged in the x direction. Among the plurality of heat generating portions 31, two adjacent heat generating portions 31 in the x direction are located separately from each other. The plurality of heat generating portions 31 are formed to contact the insulating layer 21. In the thermal print head A10, the plurality of heat generating portions 31 are formed over the top surface 130 of the convex portion 13 of the substrate 1. In they direction, the plurality of heat generating portions 31 are located in the center of the top surface 130. As shown in FIG. 4, in the thermal printer B10, the plurality of heat generating portions 31 face the pressure roller 79.

As shown in FIG. 5 and FIG. 6, the wiring layer 4 is formed to contact the resistor layer 3. The wiring layer 4 forms a conductive path for energizing the plurality of heat generating portions 31 of the resistor layer 3. The resistance rate of the wiring layer 4 is less than the resistance rate of the resistor layer 3. The wiring layer 4 is, for example, a metal layer including copper (Cu). A thickness of the insulating layer 4 is, for example, 0.3 μm or more and 2.0 μm or less. Moreover, the wiring layer 4 may be configured as including two metal layers, namely, a titanium (Ti) layer overlaying the resistor layer 3 and a copper layer overlaying the titanium layer. In this case, a thickness of the titanium layer is, for example, 0.1 μm or more and 0.2 μm or less. As shown in FIG. 1, the wiring layer 4 is located separately from the periphery of the main surface 11 of the substrate 1.

As shown in FIG. 2, the wiring layer 4 includes a common wire 41 and multiple individual wires 42. The common wire 41 is located on the downstream side with respect to the plurality of heat generating portions 31 of the resistor layer 3. The multiple individual wires 42 are located on the upstream side with respect to the plurality of heat generating portions 31. As shown in FIG. 3, when observed in the z direction, multiple regions of the resistor layer 3 that are sandwiched between the common wire 41 and the multiple individual wires 42 are the plurality of heat generating portions 31.

As shown in FIG. 2 and FIG. 3, the common wire 41 includes a base portion 411 and multiple extension portions 412. In the y direction, the base portion 411 is located farthest away from the plurality of heat generating portions 31 of the resistor layer 3. The base portion 411 is a strip extending in the x direction when observed in the z direction. The multiple extension portions 411 are strips extending from an end of the base portion 411 toward the plurality of heat generating portions 31, and the base portion 411 faces the convex portion 13 of the substrate 1 in the y direction. The multiple extension portions 412 are arranged in the x direction. A part of each of the multiple extension portions 412 is formed on the second inclined surface 132 of the convex portion 13. In the common wire 41, a current flows from the base portion 411 through the multiple extension portions 412 to the plurality of heat generating portions 31.

As shown in FIG. 2 and FIG. 3, each of the individual wires 42 includes a base portion 421 and an extension portion 422. In they direction, the base portion 421 is located farthest away from the plurality of heat generating portions 31 of the resistor layer 3. The base portions 421 of the multiple individual wires 42 are in a staggered arrangement in the x direction.

As shown in FIG. 2 and FIG. 3, the extension portion 422 is a strip extending from an end of the base portion 421 toward the plurality of heat generating portions 31, and the base portion 421 faces the convex portion 13 of the substrate 1 in the y direction. The extension portions 422 of the multiple individual wires 42 are arranged in the x direction. The respective extension portions 422 of the multiple individual wires 42 are formed on the first inclined surface 131 of the convex portion 13. In each of the multiple individual wires 42, a current flows from any of the plurality of heat generating portions 31 through the extension portion 422 to the base portion 421. When observed in the z direction, each of the plurality of heat generating portions 31 is sandwiched between any of the extension portions 422 of the multiple individual wires 42 and any of the multiple extension portions 412 of the common wire 41. In FIG. 2 and FIG. 3, the wiring layer 4 and the plurality of heat generating portions 31 form a configuration example. The configurations of the wiring layer 4 and the plurality of heat generating portions 31 of the present disclosure are not limited to the configuration example shown in FIG. 2 and FIG. 3.

As shown in FIG. 5, the protective layer 5 covers a part of the main surface 11 of the substrate 1, the plurality of heat generating portions 31 of the resistor layer 3 and the wiring layer 4. The protective layer 5 is electrically insulative. The protective layer 5 includes silicon in the composition thereof. The protective layer 5 includes, for example, any of silicon dioxide, silicon nitride ($Si_3N_4$) and silicon carbide (SiC). Alternatively, the protective layer 5 may be a layered body including multiple compositions of the substances above. A thickness of the protective layer 5 is, for example, 1.0 μm or more and 10 μm or less. In the thermal printer B10, the recording medium is pressed by the pressure roller 79 shown in FIG. 4 to the region of the protective layer 5 covering the plurality of heat generating portions 31.

As shown in FIG. 5, the protective layer 5 has a wire opening 51. The wire opening 51 passes through the protective layer 5 in the z direction. A part of each of the base portions 421 of the multiple individual wires 42 and the extension portions 422 of the multiple individual wires 42 is exposed from the wire opening 51.

As shown in FIG. 4, the wiring substrate 71 is located next to the substrate 1 in the y direction. As shown in FIG. 1, the multiple individual wires 42 are located between the plurality of heat generating portions 31 of the resistor layer 3 and the wiring substrate 71 in they direction, when observed in the z direction. An area of the wiring substrate 71 is greater than an area of the substrate 1, when observed in the z direction. Further, when observed in the z direction, the wiring substrate 71 is a rectangle having the x direction as the long-side direction. The wiring substrate 71 is, for example, a printed circuit board (PCB) substrate. Multiple driving elements 73 and a connector 77 are mounted in the wiring substrate 71.

As shown in FIG. 4, the heat dissipation member 72 faces the back surface 12 of the substrate 1. The back surface 12 is joined to the heat dissipation member 72. The wiring substrate 71 is fixed on the heat dissipation member 72 by fastening components such as screws. During the use of the thermal print head A10, a part of heat energy generated by the plurality of heat generating portions 31 of the resistor layer 3 is transmitted through the substrate 1 to the heat dissipation member 72. The heat transmitted to the heat dissipating member 72 is released to an exterior. The heat dissipation member 72 includes, for example, aluminum (Al).

As shown in FIG. 1 and FIG. 4, the multiple driving elements 73 are mounted on the wiring substrate 71 by an electrically insulative patch material (omitted from the drawing). The multiple driving elements 73 are semiconductor devices respectively forming various circuits. Each of the multiple driving elements 73 is bonded to one end of each of multiple first conducting wires 74 and one end of each of multiple second conducting wires 75. The other end of each of the multiple first conducting wires 74 is separately bonded to the base portions 421 of the multiple individual wires 42. The other end of each of the multiple second conducting wires 75 is bonded to a wire (omitted from the drawing), which is provided in the wiring substrate 71 and electrically connected to the connector 77. Accordingly, a printing signal, a control signal and the voltage of the plurality of heat generating portions 31 of the resistor layer 3 are inputted to the multiple driving elements 73 through the connector 77. The multiple driving elements 73 selectively apply a voltage to the multiple individual wires 42 according to these electrical signals. Accordingly, the plurality of heat generating portions 31 selectively generate heat.

As shown in FIG. 4, the sealing resin 76 covers a part of each of the multiple driving elements 73, the multiple first conducting wires 74, the multiple second conducting wires 75, the substrate 1 and the wiring substrate 71. The sealing resin 76 is electrically insulative. The sealing resin 76 is, for example, a black and soft composite resin as an adhesive for bottom filling. Moreover, the sealing resin 76 may also be, for example, a black and hard composite resin.

As shown in FIG. 1 and FIG. 4, the connector 77 is mounted on one end of the wiring substrate 71 in the y direction. The connector 77 is connected to the thermal printer B10. The connector 77 has multiple pins (omitted from the drawing). A part of the multiple pins are conducted to wires (omitted from the drawing) bonded with the multiple second wires 75 in the wiring substrate 71. Further, the other part of the multiple pins are conducted to wires (omitted from the drawing) bonded with the base portion 411 of the common wire 41 in the wiring substrate 71.

Details of an example of the method of fabricating the thermal print head A10 are given on the basis of FIG. 12 to FIG. 25 below. Herein, cross section positions of FIG. 12 to FIG. 15 and FIG. 20 and FIG. 25 are the same as the cross section position for representing the main part of the thermal print head A10 in FIG. 5.

Figure 12:
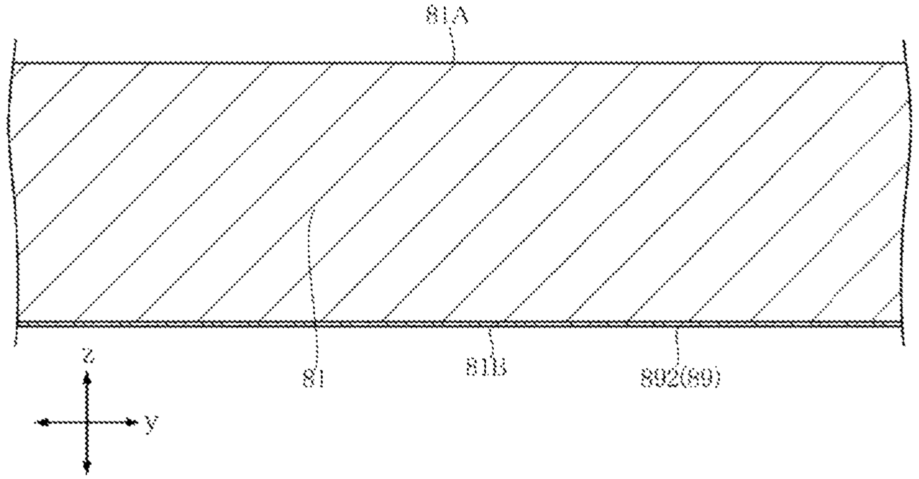
FIG. 12 is a section diagram for illustrating a fabricating step for the main part of the thermal print head in FIG. 1.
Figure 13:
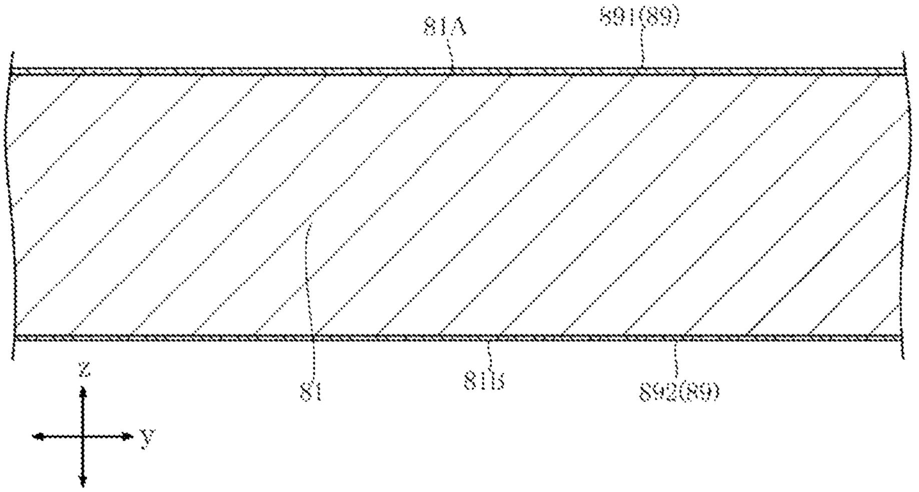
FIG. 13 is a section diagram for illustrating a fabricating step for the main part of the thermal print head in FIG. 1.
Figure 14:
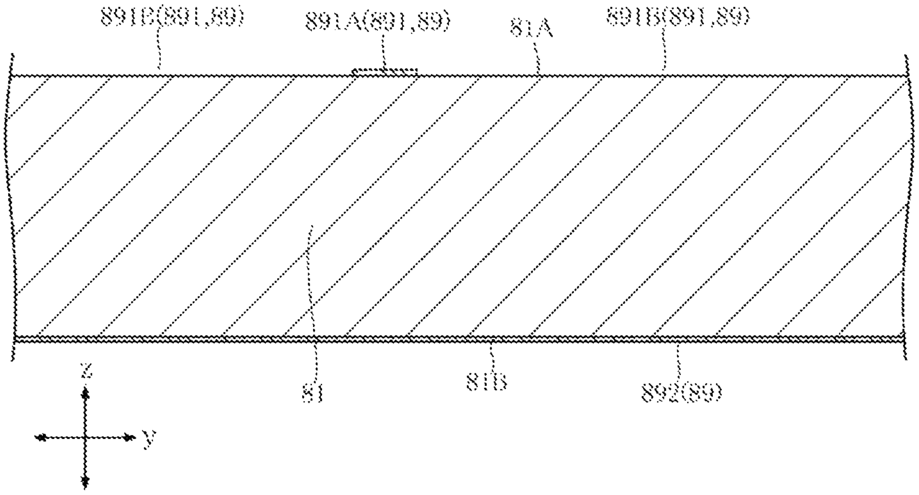
FIG. 14 is a section diagram for illustrating a fabricating step for the main part of the thermal print head in FIG. 1.

Initially, as shown in FIG. 12 to FIG. 14, a mask layer 89 is formed on the substrate 81. The substrate 81 is made of a semiconductor material. The semiconductor material includes a monocrystalline material consisting of silicon. The substrate 81 is silicon wafer. In a direction perpendicular to the z direction, multiple parts equivalently formed by connecting regions of multiple substrates 1 are equivalent to the substrate 81. The substrate 81 has a first surface 81A and a second surface 81B. The first surface 81A and the second surface 81B face opposite sides from each other in the z direction. The surface orientations of the first surface 81A and the second surface 81B of the crystalline structure based on the base material 81 are both (100) surfaces. The mask layer 89 includes a first mask layer 891 formed on the first surface 81A and a second mask layer 892 formed on the second surface 81B.

First, as shown in FIG. 12, the second mask layer 892 is formed. To form the second mask layer 892, either between a silicon nitride film and a silicon dioxide film covering an entire region of the substrate 81 is formed by means of low pressure chemical vapor deposition (CVD). Then, the film covering the first surface 81A of the substrate 81 is removed by means of wet etching using hydrofluoric acid (HF). Accordingly, the second mask layer 892 is formed.

Next, as shown in FIG. 13 and FIG. 14, the first mask layer 891 is formed. To form the first mask layer 891, as shown in FIG. 13, either between a silicon nitride film and a silicon dioxide film covering the entire first surface 81A of the substrate 81 is formed by means of plasma CVD. The temperature of the film covering the substrate 81 and formed by means of plasma CVD is lower than the temperature of the film covering the substrate 81 and formed by means of low pressure CVD (LPCVD). Then, as shown in FIG. 14, a part of the film covering the first surface 81A is removed by means of photolithography patterning and reactive ion etching (RIE). Accordingly, the first mask layer 891 is formed.

Figure 16:
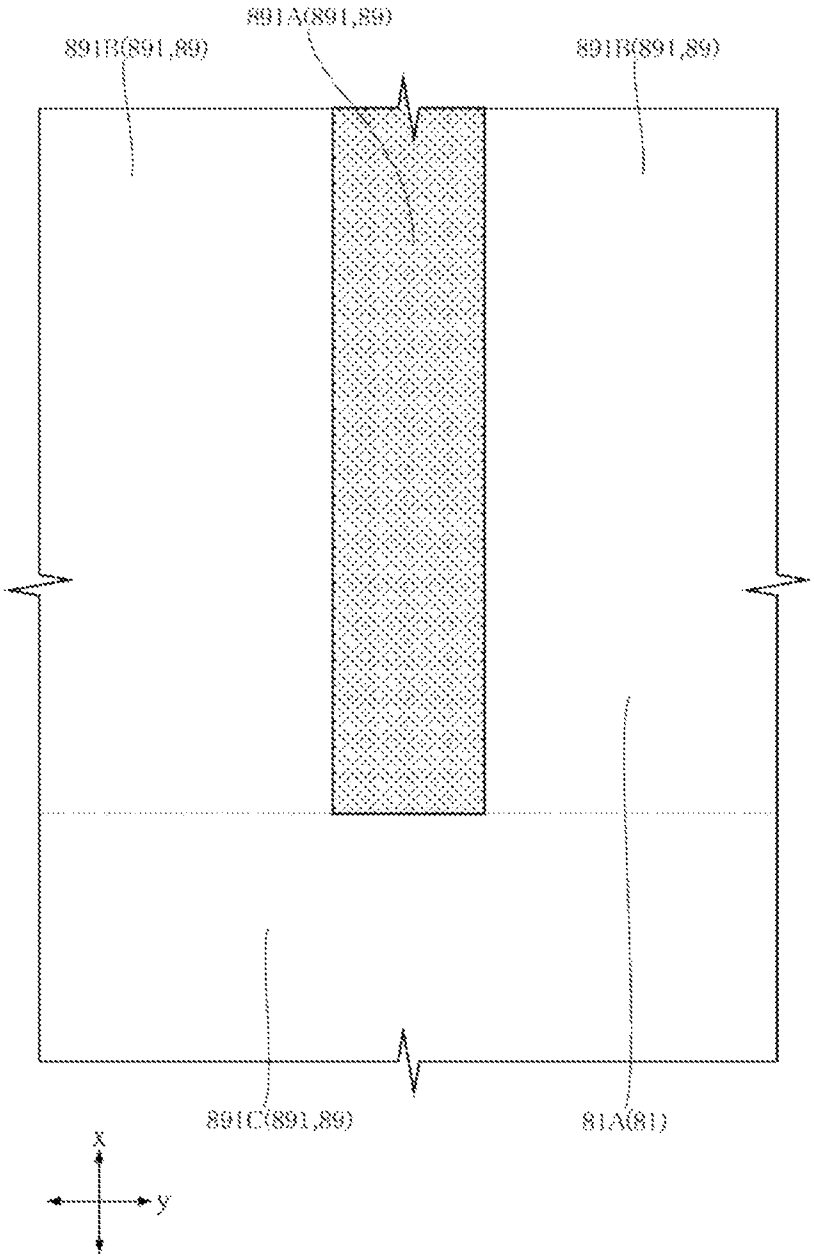
FIG. 16 is an enlarged partial top view for illustrating a fabricating step for the main part of the thermal print head in FIG. 1.

FIG. 16 shows a state after the first mask layer 891 is formed on the first surface 81A of the substrate 81. As shown in FIG. 16, the first mask layer 891 includes a covering portion 891A, two first openings 891B and a second opening 891C. The covering portion 891A extends in the x direction and covers the first surface 81A. The two first openings 891B are located in they direction with the covering portion 891A disposed in between, and extend in the x direction. The second opening 891C is located next to an end of the covering portion 891A in the x direction, and is connected to the two first openings 891B. The first surface 81A is exposed from the two first openings 891B and the second opening 891C.

Figure 15:
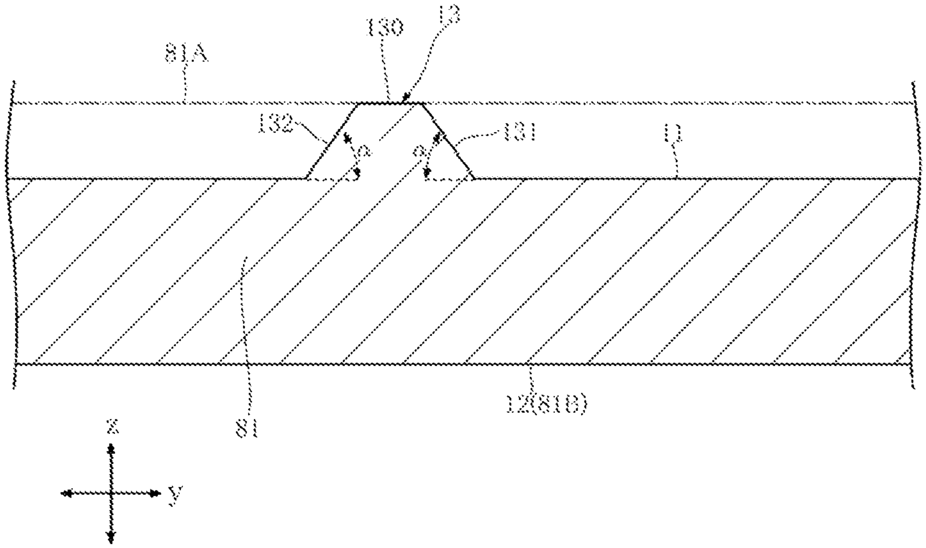
FIG. 15 is a section diagram for illustrating a fabricating step for the main part of the thermal print head in FIG. 1.

Next, as shown in FIG. 15, the main surface 11 and the convex portion 13 are formed on the substrate 81 by means of anisotropic etching, and the mask layer 89 is then removed. The main surface 11 faces a same direction as the first surface 81A of the substrate 81 in the z direction, and is located between the first surface 81A and the second surface 81B of the substrate 81. The convex portion 13 protrudes toward the z direction from the main surface 11, and extends in the x direction. Regarding the main surface 11 and the convex portion 13, the main surface 11 and the convex portion 13 are formed on the substrate 81 by performing anisotropic etching on the two first openings 891B of the first mask layer 891 and the first surface 81A exposed from the second opening 891C of the first mask layer 891. An etching solution used for the anisotropic etching is, for example, a potassium hydroxide (KOH) aqueous solution. Then, the mask layer 89 is removed by means of wet etching using hydrofluoric acid. By the steps above, the main surface 11 and the convex portion 13 are formed on the substrate 81. Further, the second surface 81B becomes the back surface 12 of the substrate 1. A region of the first surface 81A covered by the covering portion 891A of the first mask layer 891 forms the top surface 130 of the convex portion 13. Since the convex portion 13 is formed by means of anisotropic etching, respective inclination angles α of the first inclined surface 131 and the second inclined surface 132 of the convex portion 13 with respect to the main surface 11 are equal.

Figure 17:
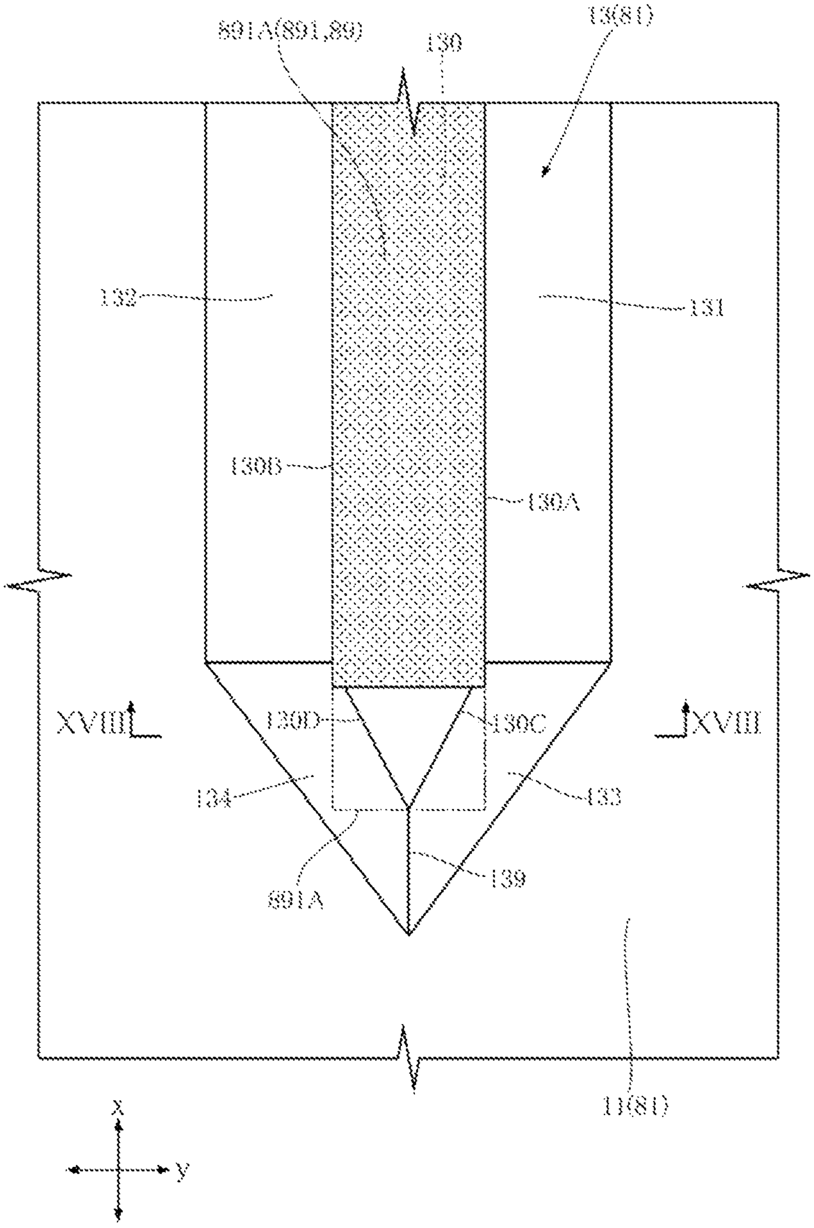
FIG. 17 is an enlarged partial top view for illustrating a fabricating step for the main part of the thermal print head in FIG. 1.
Figure 18:
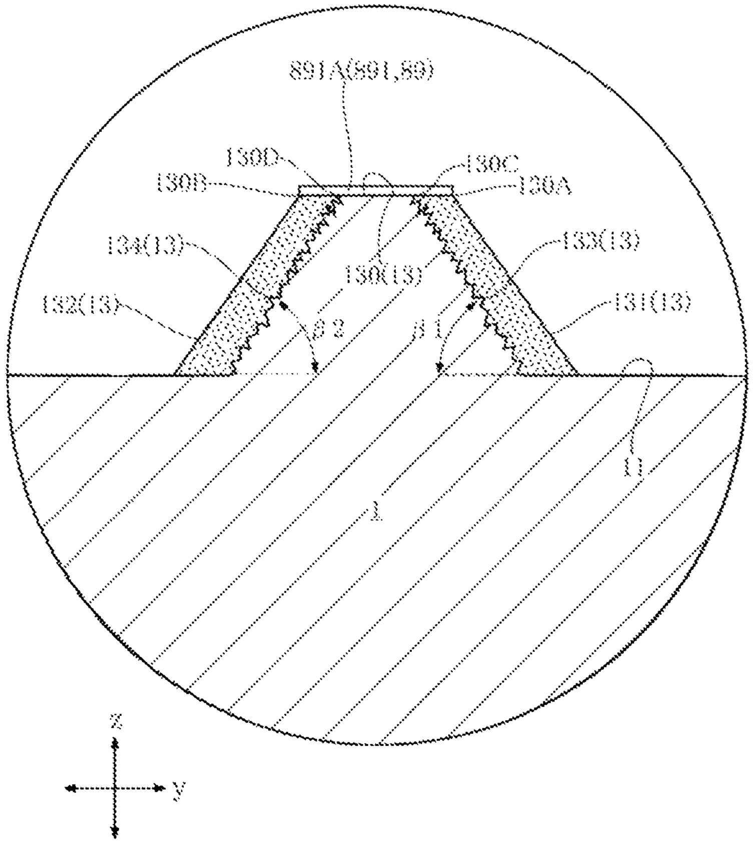
FIG. 18 is a section diagram along a section line XVIII-XVIII in FIG. 17.

FIG. 17 and FIG. 18 show states of the substrate 81 after the main surface 11 and the convex portion 13 are formed on the substrate 81 by means of anisotropic etching and before the mask layer 89 is removed. The first inclined surface 131 and the second inclined surface 132 of the convex portion 13 are formed by performing anisotropic etching on the first surface 81A exposed from the two first openings 891B of the first mask layer 891. The third inclined surface 133 and the fourth inclined surface 134 of the convex portion 13 are formed by performing anisotropic etching on the first surface 81A exposed from the second opening 891C of the first mask layer 891. At this point, the part of the covering portion 891A of the first mask layer 891 located on the third inclined surface 133 and the fourth inclined surface 134 is removed. Further, a part of the top surface 130 of the convex portion 13 is exposed from the first mask layer 891. This is because the part is already dissolved in the etching solution used for anisotropic etching. When the silicon nitride film and silicon dioxide film are formed by means of plasma CVD, they are more easily dissolved in an etching solution than when being formed by means of low pressure CVD. Thus, the first mask layer 891 is more easily dissolved in the etching solution than the second mask layer 892. As shown in FIG. 18, the respective surface roughness of the third inclined surface 133 and the fourth inclined surface 134 are greater than the respective roughness of the first inclined surface 131 and the second inclined surface 132. In FIG. 18, dotted areas respective represented the third inclined surface 133 and the fourth inclined surface 134 closer to the back than a cross section shown in the drawing.

Figure 19:
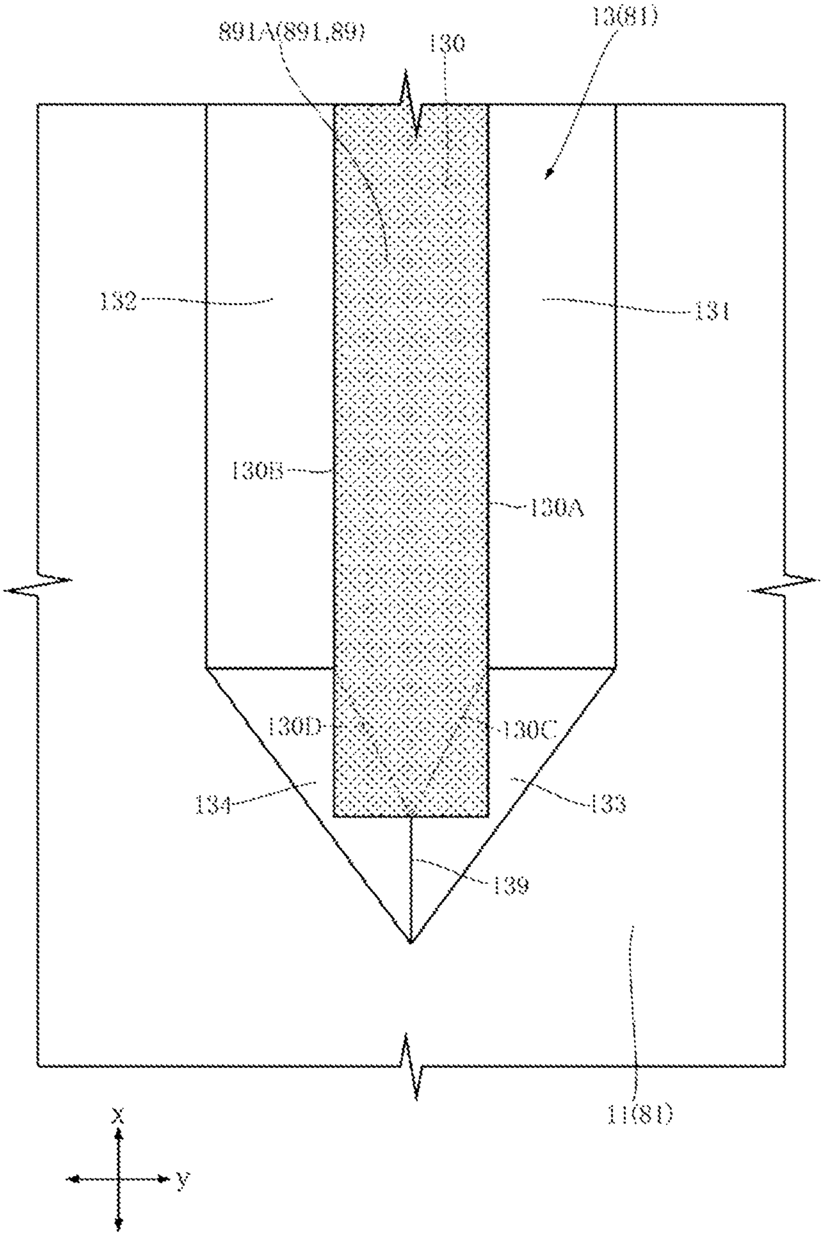
FIG. 19 is an enlarged partial top view for illustrating a fabricating step for the main part of the thermal print head in FIG. 1.

FIG. 19 further shows a state of the substrate 81 after the main surface 11 and the convex portion 13 are formed on the substrate 81 by means of anisotropic etching and before the mask layer 89 is removed. However, the method of fabricating the first mask layer 891 is different from the method of fabricating the first mask layer 891 shown in FIG. 17. The first mask layer 891, similar to the second mask layer 892, is formed by means of low pressure CVD. Accordingly, the first mask layer 891 is less easily dissolved in an etching solution than the first mask layer 891 shown in FIG. 17. Thus, the part of the covering portion 891A of the first mask layer 891 located on the third inclined surface 133 and the fourth inclined surface 134 of the convex portion 13 is not removed. As a result, even if the properties of the first mask layer 891 and the properties of the second mask layer 892 are then same, the third inclined surface 133 and the fourth inclined surface 134 are formed on the convex portion 13.

Figure 20:
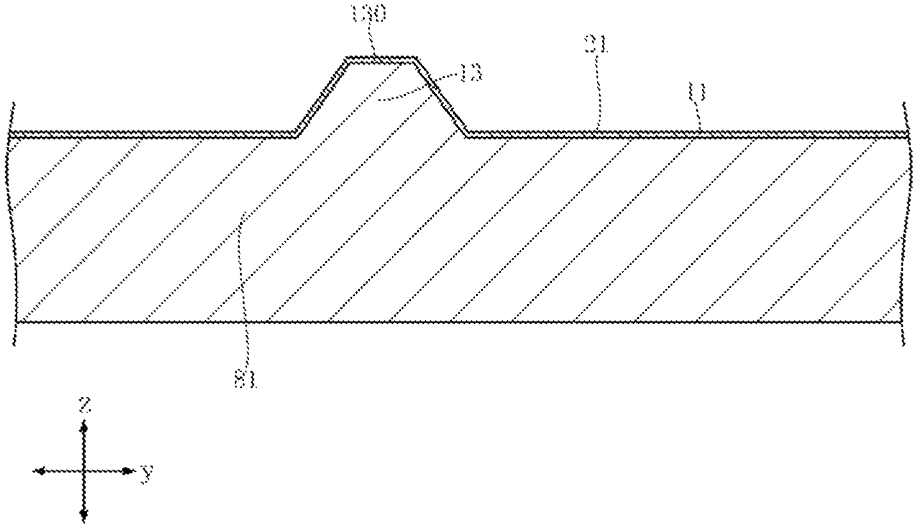
FIG. 20 is a section diagram for illustrating a fabricating step for the main part of the thermal print head in FIG. 1.

Next, as shown in FIG. 20, the insulating layer 21 covering the main surface 11 and the convex portion 13 of the substrate 81 is formed. The insulating layer 21 is formed by layering a silicon dioxide film formed by using tetraethyl orthosilicate (TEOS) as the raw material for multiple times by means of plasma CVD.

Figure 21:
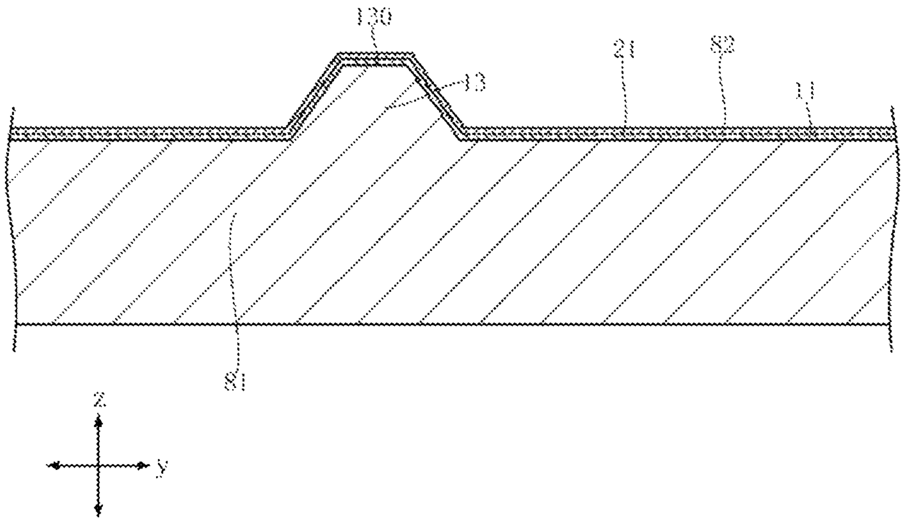
FIG. 21 is a section diagram for illustrating a fabricating step for the main part of the thermal print head in FIG. 1.
Figure 22:
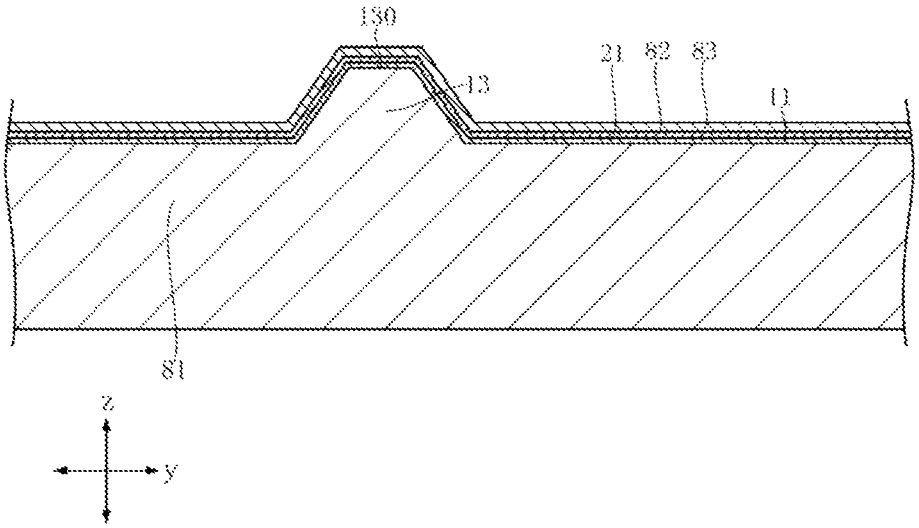
FIG. 22 is a section diagram for illustrating a fabricating step for the main part of the thermal print head in FIG. 1.
Figure 23:
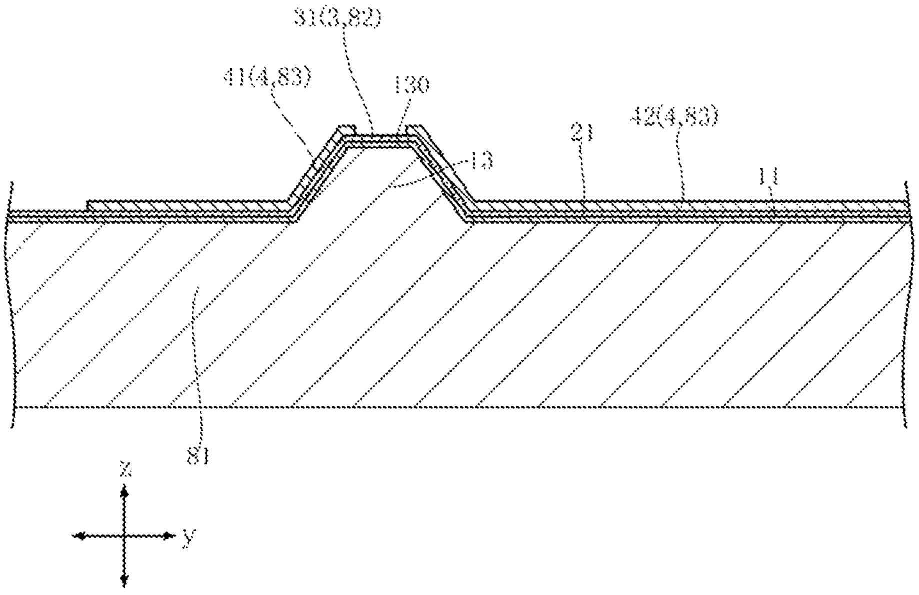
FIG. 23 is a section diagram for illustrating a fabricating step for the main part of the thermal print head in FIG. 1.

Next, as shown in FIG. 21 to FIG. 23, the resistor layer 3 and the wiring layer 4 are formed. The resistor layer 3 includes the plurality of heat generating portions 31 arranged in the x direction. The wiring layer 4 is conducted to the plurality of heat generating portions 31. Accordingly, the step of forming the wiring layer 4 includes a step of forming the common wire 41 and the multiple individual wires 42. In the substrate 81, the common wire 41 is located on one side in the y direction with respect to the plurality of heat generating portions 31 of the resistor layer 3 shown in FIG. 13. In the substrate 81, the multiple individual wires 42 are located on the other side in the y direction with respect to the plurality of heat generating portions 31 in FIG. 13.

First, as shown in FIG. 21, a resistor film 82 is formed on the main surface 11 and the convex portion 13 of the substrate 81. The resistor film 82 is formed to cover the entire surface of the insulating layer 21. The resistor film 82 is formed on the insulating layer 21 by layering a tantalum nitride film by means of sputtering.

Next, as shown in FIG. 22, a conductive layer 83 covering the entire surface of the resistor film 82 is formed. The conductive layer 83 is formed on the resistor film 82 by layering a copper film for multiple times by means of sputtering. In addition, to form the conductive layer 83, the following method may also be adopted: after layering a titanium film on the resistor film 82 by means of sputtering, layering a copper film for multiple times on the titanium film by means of sputtering.

Next, as shown in FIG. 23, a part of the conductive layer 83 is removed after performing photolithography patterning on the conductive layer 83. The removing is performed by means of wet etching using a mixed solution of sulfuric acid ($H_2SO_4$) and hydrogen peroxide ($H_2O_2$). Accordingly, the common wire 41 and the multiple individual wires 42 are formed to contact the resistor film 82. Meanwhile, a region of the resistor film 82 formed on the top surface 130 of the convex portion 13 of the substrate 81 is exposed from the wiring layer 4. Then, a part of the resistor film 82 is removed after performing photolithography patterning on the resistor film 82 and the wiring layer 4. The removing is performed by means of reactive ion etching. Accordingly, the resistor layer 3 is formed on the main surface 11 and the convex portion 13 of the substrate 81. The plurality of heat generating portions 31 appear on the top surface 130 of the substrate 81.

Figure 24:
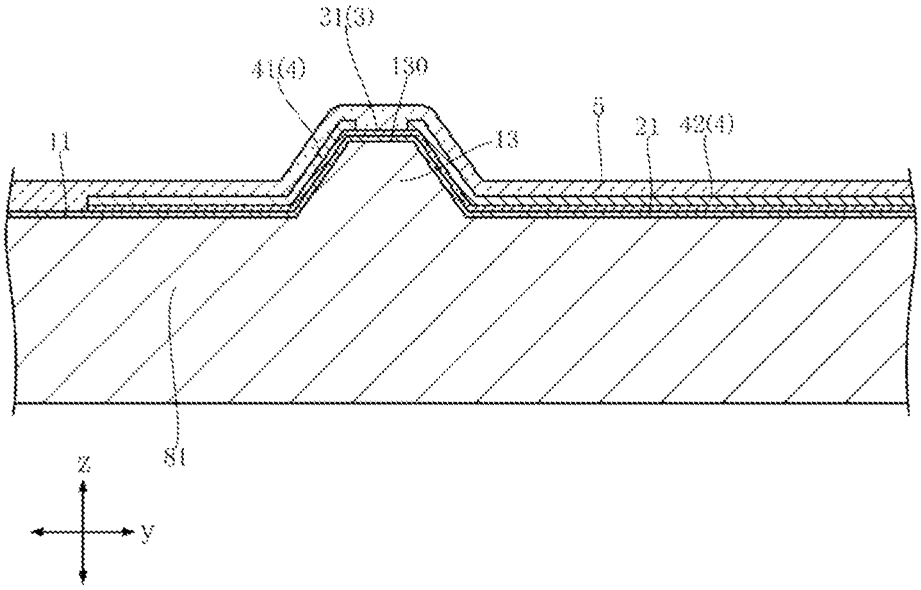
FIG. 24 is a section diagram for illustrating a fabricating step for the main part of the thermal print head in FIG. 1.

Next, as shown in FIG. 24, the protective layer 5 covering a part of the main surface 11 of the substrate 81, the plurality of heat generating portions 31 of the resistor layer 3 and the wiring layer 4 is formed. The protective layer 5 is formed by layering a silicon nitride film by means of plasma CVD.

Figure 25:
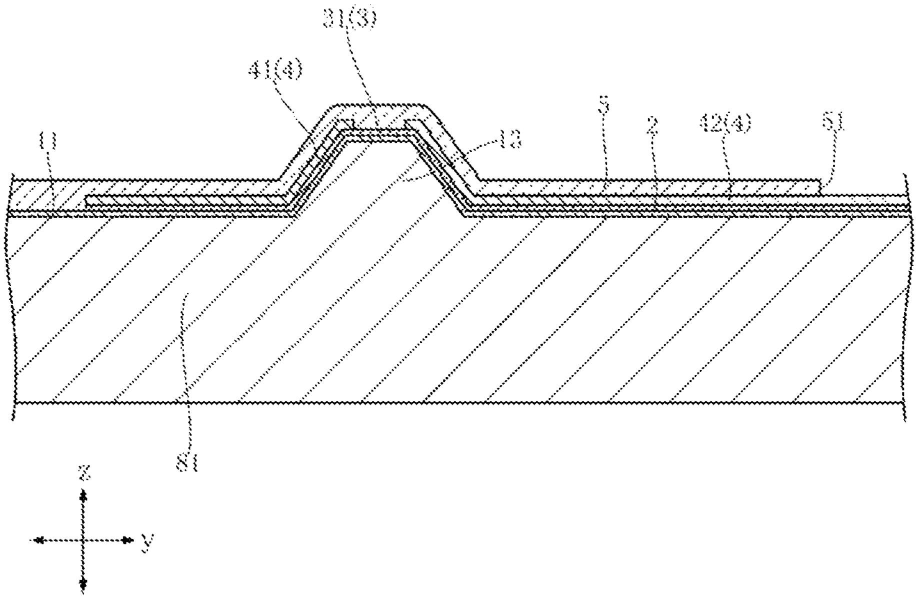
FIG. 25 is a section diagram for illustrating a fabricating step for the main part of the thermal print head in FIG. 1.

Next, as shown in FIG. 25, the wire opening 51 passing through in the z direction is formed in the protective layer 5. The wire opening 51 is formed by removing a part of the protective layer 5 after performing photolithography patterning on the protective layer 5. The removing is performed by means of reactive ion etching. A part of each of the multiple individual wires 42 (a part of each of the base portions 421 of the multiple individual wires 42 and a part of each of the extension portions 422 of the multiple individual wires 42 in FIG. 5) is exposed from the wire opening 51. The part serving as a part of each of the multiple individual wires 42 and exposed from the wire opening 51 forms, for example, the base portion 421 to which the multiple first conducting wires 74 are individually bonded by wire bonding. Alternatively, a metal layer such as gold may be layered by plating on each part (including the base portion 421) of the plurality of individual wires 42 exposed from the wire opening 51.

Next, the substrate 81 is cut in the thickness direction along the x direction and the y direction. Accordingly, the chip obtained becomes the main part of the thermal print head A10 including the substrate 1. A cutting device for the substrate 81 is, for example, a cutting machine. A cut line of the substrate 81 is set at a position way from the convex portion 13 of the substrate 81. Accordingly, a blade of the cutting device does not contact the convex portion 13.

Next, the multiple driving elements 73 and the connector 77 are mounted on the wiring substrate 71. Then, the back surface 12 of the substrate 1 and the wiring substrate 71 are joined with the heat dissipation member 72. Next, the multiple first conducting wires 74 and the multiple second conducting wires 75 are joined for the wiring substrate 71. Lastly, the sealing resin 76 covering the driving elements 73, the multiple first conducting wires 74 and the multiple second conducting wires 75 is formed for the substrate 1 and the wiring substrate 71. The thermal print head A10 is obtained by the steps above.

Next, effects of the thermal print head A10 are given below.

The thermal print head A10 includes the substrate 1, which has the main surface 11 and the convex portion 13 and is made of a semiconductor material. The convex portion 13 has the top surface 130, the first inclined surface 131 and the second inclined surface 132. At least one of two ends of the convex portion 13 in the x direction forms the third inclined surface 133 and the fourth inclined surface 134. The third inclined surface 133 is inclined with respect to the main surface 11 and the first inclined surface 131. The fourth inclined surface 134 is inclined with respect to the main surface 11 and the second inclined surface 132. Accordingly, at least one of two ends of the convex portion 13 in the x direction and an end surface of the convex portion 13 connected to the main surface 11, the first inclined surface 131 and the second inclined surface 132 include the third inclined surface 133 and the fourth inclined surface 134. The end surface does not erect steeply from the main surface 11 in they direction and the z direction, but inclines with respect to the main surface 11, the first inclined surface 131 and the second inclined surface 132. Thus, the thermal print head A10 is capable of inhibiting sharpening of an end of the convex portion 13 in the x direction.

The fabricating of the thermal print head A10 includes the following steps. That is, before the step of forming the main surface 11 and the convex portion 13 on the substrate 81 by means of anisotropic etching, the mask layer 89 is formed on the first surface 81A and the second surface 81B of the substrate 81. The mask layer 89 includes the first mask layer 891 formed on the first surface 81A and the second mask layer 892 formed on the second surface 81B. The first mask layer 891 includes the covering portion 891A, the two first openings 891B and the second opening 891C. The first surface 81A is exposed from the two first openings 891B and the second opening 891C. Accordingly, in addition to including the top surface 130, the first inclined surface 131 and the second inclined surface 132, the convex portion 13 formed further includes the third inclined surface 133 and the fourth inclined surface 134.

The first mask layer 891 is more easily dissolved in the etching solution used for the anisotropic etching than the second mask layer 892. Accordingly as shown in FIG. 16, the part of the covering portion 891A of the first mask layer 891 located on the third inclined surface 133 and the fourth inclined surface 134 of the convex portion 13 is removed by means of anisotropic etching. As a result, the mask layer 89 can be removed more efficiently after the main surface 11 and the convex portion 13 are formed on the substrate 81.

The third inclined surface 133 and the fourth inclined surface 134 of the convex portion 13 become closer to each other toward the top surface 130 of the convex portion 13 from the main surface 11. Thus, the third inclined surface 133 and the fourth inclined surface 134 connected to the top surface 130 and are inclined with respect to the top surface 130. Accordingly, respective intersection angles of the third inclined surface 133 and the fourth inclined surface 134 with respect to the top surface 130 both form obtuse angles. Thus, sharpening of the third edge 310C and the fourth edge 130D forming boundaries of the third inclined surface 133 and the fourth inclined surface 134 with the top surface 130 is inhibited.

In the top surface 130 of the convex portion 13, the third edge 130C is inclined with respect to the first edge 130A in the x direction, and the fourth edge 130D is inclined with respect to the second edge 130B in the x direction. Hence, the third edge 130C and the fourth edge 130D become close to each other when being separated from the first edge 130A and the second edge 130B in the x direction. Accordingly, an area of the end of the top surface 130 in the x direction gradually becomes smaller when being separated from the plurality of heat generating portions 31 of the resistor layer 3 in the x direction. Thus, a contact area of an end of the recording medium in the x direction with respect to the thermal print head A10 also becomes smaller. This inhibits damage of the recording medium caused by the contact of the thermal print head A10.

The semiconductor material contained in the substrate 1 includes a monocrystalline material consisting of silicon. Accordingly, heat conductivity of the substrate 1 is relatively large (approximately 170 W/m·k), and costs of the substrate 1 can be reduced.

The substrate 1 includes the convex portion 13 protruding from the main surface 11 toward the z direction. The plurality of heat generating portions 31 of the resistor layer 3 are formed on the convex portion 13. Accordingly, when printing is performed on the recording medium in FIG. 4, a contact area of the recording medium with respect to the thermal print head A10 can be minimized, and heat from the plurality of heating generating portions 31 can be transmitted to the recording medium. Thus, printing quality on the recording medium can be enhanced.

The thermal print head A10 further includes the protective layer 5 covering both the plurality of heat generating portions 31 and the wiring layer 4 of the resistor layer 3. Accordingly, by protecting the plurality of heat generating portions 31 and the wiring layer 4 by the protective layer 5, the contact of the recording medium with respect to the thermal print head A10 becomes smoother during the use of the thermal print head A10.

The thermal print head A10 further includes the heat dissipation member 72. The back surface 12 of the substrate 1 is joined to the heat dissipation member 72. Accordingly, during the use of the thermal print head A10, a part of heat energy generated by the plurality of heat generating portions 31 is rapidly released to the exterior through the substrate 1 and the heat dissipation member 72.

Second Embodiment

On the basis of FIG. 26 and FIG. 27, a thermal print head A20 according to a second embodiment of the present disclosure is described below. In these drawings, elements the same as or similar to those of the thermal print head A10 above are given the same numerals and denotations, and repeated description is omitted. Herein, a cross section position FIG. 26 is the same as the cross section position for representing the main part of the thermal print head A10 in FIG. 5.

The thermal print head A20 further differs from the thermal print head A10 in respect of further including a glaze layer 22.

Figure 26:
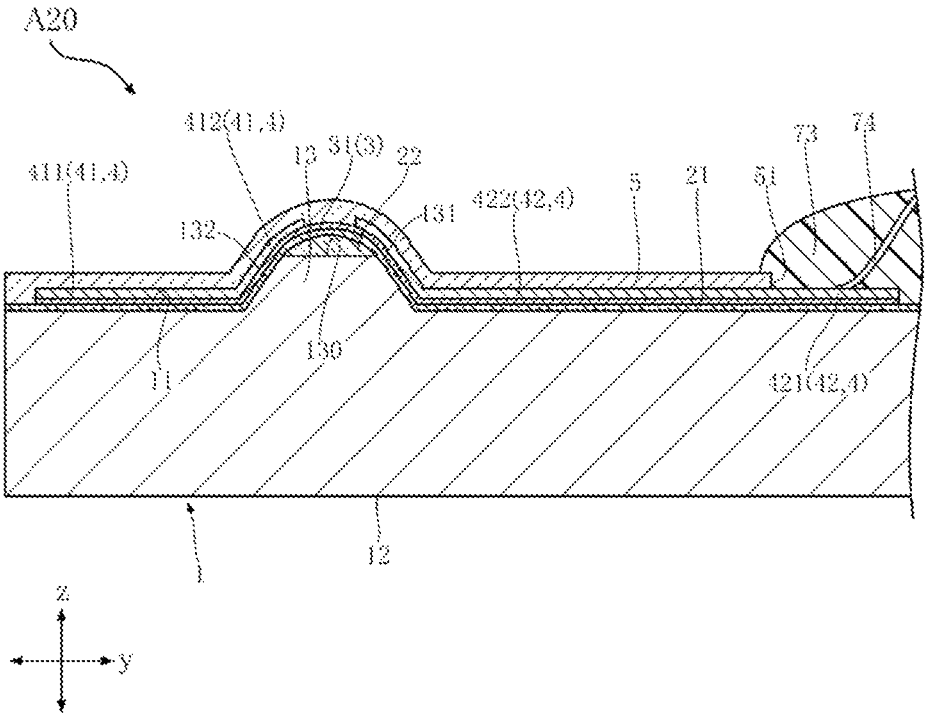
FIG. 26 is a section diagram of a main part of a thermal print head according to a second embodiment of the present disclosure.
Figure 27:
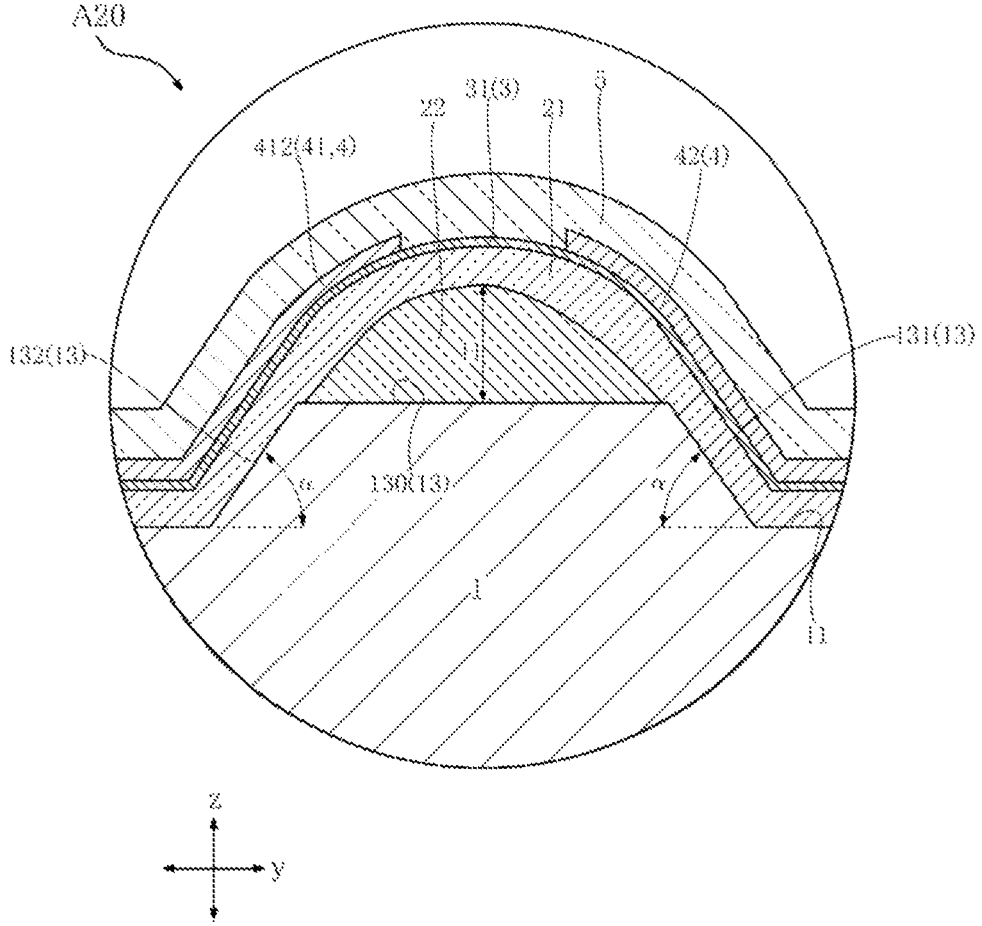
FIG. 27 is an enlarged partial view of FIG. 26.

As shown in FIG. 26 and FIG. 27, the glaze layer 22 is located between the top layer 130 of the convex portion 13 and the insulating layer 21. The glaze layer 22 includes, for example, amorphous glass. Accordingly, the glaze layer 22 is made of a glass-containing material. A linear expansion coefficient of the glaze layer 22 is equal to a linear expansion coefficient of the substrate 1. As shown in FIG. 27, the glaze layer 22 bulges toward one side to which the top surface 130 faces in the z direction. A size H of the glaze layer 22 in the z direction is the largest in a center of the glaze layer 22 in they direction.

Details of an example of a method of fabricating the thermal print head A20 are given on the basis of FIG. 28 below. Herein, a cross section position FIG. 25 is the same as the cross section position for representing the main part of the thermal print head A10 in FIG. 5.

Figure 28:
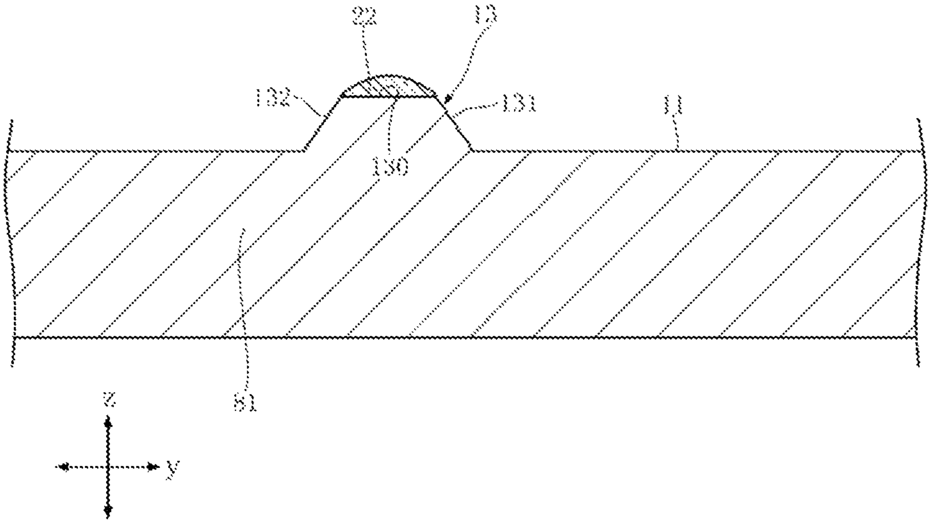
FIG. 28 is a section diagram for illustrating a fabricating step for the main part of the thermal print head in FIG. 26.

After the fabricating steps of the main part of the thermal print head A10 as shown by the steps in FIG. 15 to FIG. 19, as shown in FIG. 28, the glaze layer 22 is formed to contact the top surface 130 of the convex portion 13; in the steps shown in FIG. 15 to FIG. 19, the mask layer 90 is removed after the main surface 11 and the convex portion 13 are formed on the substrate 81. The glaze layer 22 is formed by supplying a glaze material in a fluid to the top surface 130 and then firing the glaze material. The glaze material is, for example, injected by a distributor. The glaze material includes a glass material such as amorphous glass. The glaze material may also be applied repeatedly for multiple times. In another example of supplying the glaze material, in an exemplary method, the glaze material may be printed to the top surface 130 by a wire mesh. After the glaze layer 22 is formed, the thermal print head A20 can be obtained after performing the steps the same as the fabricating steps of the main part of the thermal print head A10 as shown by the steps in FIG. 20 to FIG. 25.

Next, effects of the thermal print head A20 are given below.

The thermal print head A20 includes the substrate 1, which has the main surface 11 and the convex portion 13 and is made of a semiconductor material. The convex portion 13 has the top surface 130, the first inclined surface 131 and the second inclined surface 132. At least one of two ends of the convex portion 13 in the x direction forms the third inclined surface 133 and the fourth inclined surface 134. The third inclined surface 133 is inclined with respect to the main surface 11 and the first inclined surface 131. The fourth inclined surface 134 is inclined with respect to the main surface 11 and the second inclined surface 132. Thus, the thermal print head A20 is capable of inhibiting sharpening of an end of the convex portion 13 in the x direction. Therefore, the thermal print head A20 functions to provide the same effects and results equivalent to the thermal print head A1 with the common configuration as the thermal print head A10.

The thermal print head A20 further includes the glaze layer 22 located between the top surface 130 of the convex portion 13 and the insulating layer 21. The glaze layer 22 bulges toward one side to which the top surface 130 faces in the z direction. With the configuration above, the scale of the convex portion 13 formed can be suppressed, and a contact area of the recording medium with respect to the thermal print head A20 becomes smaller. Accordingly, the glaze layer 22 provides an effect of accumulating the heat generated by the plurality of heat generating portions 31. Thus, the thermal print head A20 improves printing performance, and enhances printing quality completed on the recording medium using the plurality of heat generating portions 31.

Third Embodiment

On the basis of FIG. 29 and FIG. 30, a thermal print head A30 according to a third embodiment of the present disclosure is described below. In these drawings, elements the same as or similar to those of the thermal print head A10 above are given the same numerals and denotations, and repeated description is omitted. Herein, a cross section position FIG. 29 is the same as the cross section position for representing the main part of the thermal print head A10 in FIG. 5.

In the thermal print head A30, the configuration of the convex portion 13 of the substrate 1 and the configuration of the plurality of heat generating portions 31 of the resistor layer 3 are different from the corresponding configurations in the thermal print head A10 described above.

Figure 29:
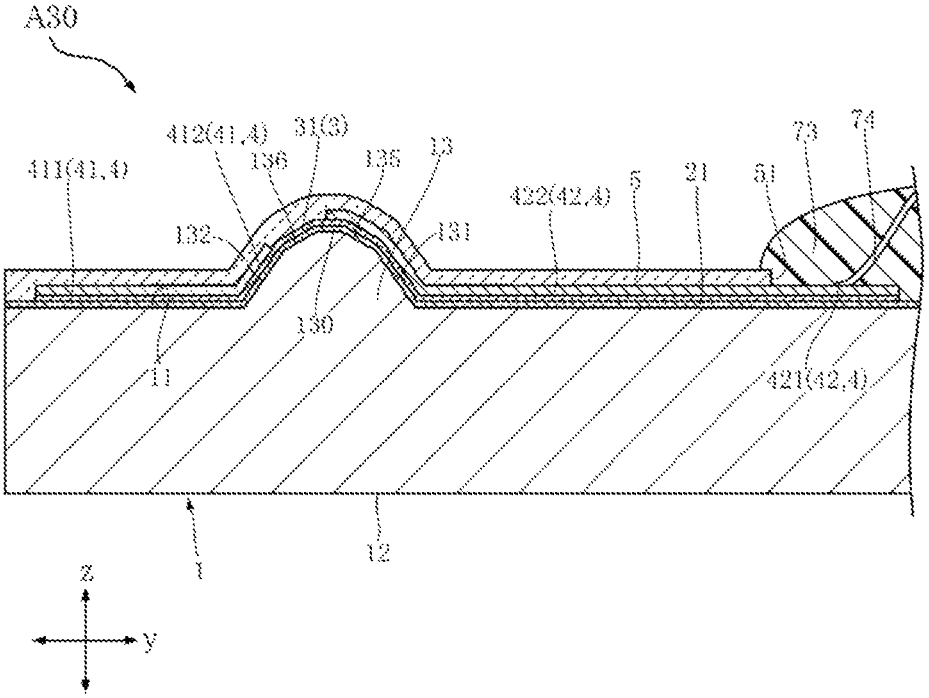
FIG. 29 is a section diagram of a main part of a thermal print head according to a third embodiment of the present disclosure.
Figure 30:
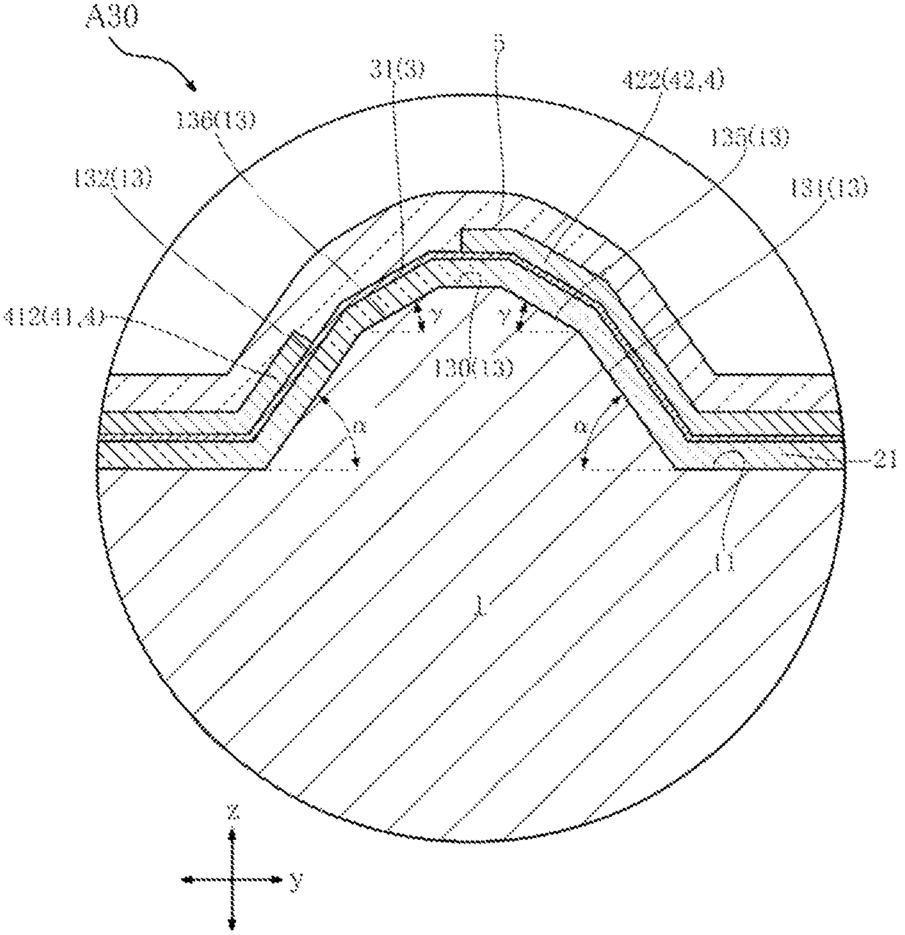
FIG. 30 is an enlarged partial view of FIG. 29.

As shown in FIG. 29 and FIG. 30, the convex portion 13 has a fifth inclined surface 135 and a sixth inclined surface 136. The fifth inclined surface 135 and the sixth inclined surface 136 are connected to the top surface 130 and are inclined with respect to the main surface 11 of the substrate 1 and the top surface 130. The fifth inclined surface 135 is located on a side where the first inclined surface 131 of the convex portion 1 is located in they direction. The sixth inclined surface 136 is located on a side where the second inclined surface 132 of the convex portion 2 is located in the y direction. The fifth inclined surface 135 and the sixth inclined surface 136 become closer to each other toward the top surface 130 from the main surface 11.

As shown in FIG. 30, respective inclination angles γ of the fifth inclined surface 135 and the sixth inclined surface 136 with respect to the main surface 11 are equal. The inclination angle γ of the fifth inclined surface 135 is smaller than the inclination angle α of the first inclination surface 131 with respect to the main surface 11. The inclination angle γ of the sixth inclined surface 136 is smaller than the inclination angle α of the second inclination surface 132 with respect to the main surface 11. The fifth inclined surface 135 and the sixth inclined surface 136 can be formed by performing the step below between the step shown in FIG. 15 and the step in FIG. 20 associated with the fabricating of the thermal print head A10. The step is performing wet etching on a boundary between the top surface 130 and the first inclined surface 130 and a boundary between the top surface 130 and the second inclined surface 312 using an aqueous solution of tetramethylammonium hydroxide (TMAH).

As shown in FIG. 30, the plurality of heat generating portions 31 of the resistor layer 3 are formed on the top surface 130, the sixth inclined surface 136 and the second inclined surface 132 of the convex portion 13. In addition, the plurality of heat generating portions 31 may also be configured to be formed on the top surface 130, the fifth inclined surface 135 and the first inclined surface 131 of the convex portion 13.

Next, effects of the thermal print head A30 are given below.

The thermal print head A30 includes the substrate 1, which has the main surface 11 and the convex portion 13 and is made of a semiconductor material. The convex portion 13 has the top surface 130, the first inclined surface 131 and the second inclined surface 132. At least one of two ends of the convex portion 13 in the x direction forms the third inclined surface 133 and the fourth inclined surface 134. The third inclined surface 133 is inclined with respect to the main surface 11 and the first inclined surface 131. The fourth inclined surface 134 is inclined with respect to the main surface 11 and the second inclined surface 132. Thus, the thermal print head A30 is capable of inhibiting sharpening of an end of the convex portion 13 in the x direction. Therefore, the thermal print head A30 functions to provide the same effects and results equivalent to the thermal print head A1 with the common configuration as the thermal print head A10.

In the thermal print head A30, the convex portion 13 has the fifth inclined surface 135 and the sixth inclined surface 136. The fifth inclined surface 135 and the sixth inclined surface 136 are connected to the top surface 130 and are inclined with respect to the main surface 11 of the substrate 1 and the top surface 130. The inclination angle γ of the fifth inclined surface 135 is smaller than the inclination angle α of the first inclination surface 131 with respect to the main surface 11. The inclination angle γ of the sixth inclined surface 136 is smaller than the inclination angle α of the second inclination surface 132 with respect to the main surface 11. Using the configuration above, the shape of a part of the wiring layer 4 formed along the convex portion 13 becomes smoother. Moreover, in the wiring layer 4 formed along the convex portion 13, occurrences of damage and breaking of wiring patterns are inhibited.

The present disclosure is not limited to the embodiments described above. Various design modifications may be made as desired to the specific structures of the components of the present disclosure.

Notes regarding the thermal print head and the fabricating method thereof provided by the present disclosure are given below.

[Note 1]

A thermal print head, including:

a substrate, made of a semiconductor material, and having a main surface facing a thickness direction and a convex portion protruding from the main surface and extending in a main scanning direction;

a resistor layer, including a plurality of heat generating portions arranged in the main scanning direction and located on the convex portion; and a wiring layer, conducted to the plurality of heat generating portions and formed to contact the resistor layer, wherein the convex portion includes:

- a top surface, facing the thickness direction and located away from the main surface; and
- a first inclined surface and a second inclined surface that are connected to the main surface, located away from each other in a sub scanning direction, and inclined with respect to the main surface, and wherein
- at least one of two ends of the convex portion in the main scanning direction forms a third inclined surface connected to the main surface and the first inclined surface, and a fourth inclined surface connected to the main surface and the second inclined surface, the third inclined surface is inclined with respect to the main surface and the first inclined surface and the fourth inclined surface is inclined with respect to the main surface and the second inclined surface.

[Note 2]

The thermal print head of note 1, wherein an area of the third inclined surface is less than an area of the first inclined surface, and an area of the fourth inclined surface is less than an area of the second inclined surface.

[Note 3]

The thermal print head of note 2, wherein the first inclined surface and the second inclined surface become closer to each other toward the top surface from the main surface, and the third inclined surface and the fourth inclined surface become closer to each other toward the top surface from the main surface.

[Note 4]

The thermal print head of note 3, wherein the first inclined surface and the second inclined surface are connected to the top surface and are inclined with respect to the top surface, and the third inclined surface and the fourth inclined surface are connected to the top surface and are inclined with respect to the top surface.

[Note 5]

The thermal print head of note 4, wherein a peripheral edge of the top surface includes:

a first edge, forming a boundary with the first inclined surface;

a second edge, forming a boundary with the second inclined surface;

a third edge, forming a boundary with the third inclined surface; and a fourth edge, forming a boundary with the fourth inclined surface;

wherein the third edge is inclined with respect to the first edge in the main scanning direction, and the fourth edge is inclined with respect to the second edge in the main scanning direction.

[Note 6]

The thermal print head of note 5, wherein the third edge and the fourth edge become closer to each other when being separated from the first edge and the second edge in the main scanning direction.

[Note 7]

The thermal print head of note 3, wherein the convex portion is connected to the top surface and includes a fifth inclined surface and a sixth inclined surface inclined with respect to the main surface and the top surface, and wherein the fifth inclined surface is located on a side where the first inclined surface is located in the sub scanning direction, the sixth inclined surface is located on a side where the second inclined surface is located in the sub scanning direction, the fifth inclined surface and the sixth inclined surface become closer to each other toward the top surface from the main surface, an inclination angle of the fifth inclined surface with respect to the main surface is less than an inclination angle of the first inclined surface with respect to the main surface, and an inclination angle of the sixth inclined surface with respect to the main surface is less than an inclination angle of the second inclined surface with respect to the main surface.

[Note 8]

The thermal print head of any one of notes 3 to 7, wherein the third inclined surface and the fourth inclined surface are connected to each other in the sub scanning direction.

[Note 9]

The thermal print head of note 8, wherein a ridge line forming a boundary between the third inclined surface and the fourth inclined surface is inclined with respect to the main surface.

[Note 10]

The thermal print head of note 9, wherein the ridge line is located outside the main scanning direction with respect to the top surface from a view along the thickness direction.

[Note 11]

The thermal print head of any one of notes 3 to 10, wherein a surface roughness of the third inclined surface is greater than a surface roughness of the first inclined surface, and a surface roughness of the fourth inclined surface is greater than a surface roughness of the second inclined surface.

[Note 12]

The thermal print head of any one of notes 1 to 11, further including an insulating layer covering the main surface and the convex portion, wherein the insulating layer is disposed between the substrate and the resistor layer.

[Note 13]

The thermal print head of any one of notes 1 to 12, wherein the wiring layer includes a common wire and a plurality of individual wires, the common wire is conducted to the plurality of heat generating portions, and the plurality of individual wires are individually conducted to the plurality of heat generating portions.

[Note 14]

The thermal print head of any one of notes 1 to 13, further including a protective layer covering the plurality of heat generating portions and the wiring layer.

[Note 15]

The thermal print head of any one of notes 1 to 14, further including a heat dissipation member, wherein the substrate has a back surface facing away from the main surface in the thickness direction, and the back surface is joined to the heat dissipation member.

[Note 16]

A method of fabricating a thermal print head, including:

- forming a mask layer on a first surface and a second surface of a substrate made of a semiconductor material, wherein the first surface and the second surface face opposite sides of each other in a thickness direction;
- forming a main surface and a convex portion on the substrate by an anisotropic etching, wherein the main surface faces a same direction as the first surface in the thickness direction and is located between the first surface and the second surface, and the convex portion protrudes from the main surface;
- removing the mask layer;
- forming a resistor layer including a plurality of heat generating portions arranged in a main scanning direction and on the convex portion; and
- forming a wiring layer conducting the plurality of heat generating portions and in contact with the resistor layer, wherein
- the mask layer includes a first mask layer formed on the first surface and a second mask layer formed on the second surface, and the first mask layer includes:
  - a covering portion, extending in the main scanning direction and covering the first surface;
    - two first openings, located in the sub scanning direction with the covering portion disposed in between, and extending in the main scanning direction; and a second opening, located next to an end of the covering portion in the main scanning direction, and connected to the two first openings, and wherein the first surface is exposed from the two first openings and the second opening.

[Note 17]

The method of fabricating a thermal print head of note 16, wherein the first mask layer is more easily dissolved in an etching solution used for the anisotropic etching than the second mask layer.

[Note 18]

The method of fabricating a thermal print head of note 17, wherein the first mask layer is formed by plasma chemical vapor deposition (CVD), and the second mask layer is formed by low pressure CVD (LPCVD).

The invention claimed is:

1. A thermal print head, comprising:

a substrate, made of a semiconductor material, and having a main surface facing a thickness direction and a convex portion protruding from the main surface and extending in a main scanning direction;

a resistor layer, including a plurality of heat generating portions arranged in the main scanning direction and located on the convex portion; and a wiring layer, conducted to the plurality of heat generating portions and formed to contact the resistor layer, wherein the convex portion includes:

a top surface, facing the thickness direction and located away from the main surface; and a first inclined surface and a second inclined surface that are connected to the main surface, located away from each other in a sub-scanning direction, and inclined with respect to the main surface, and wherein at least one of two ends of the convex portion in the main scanning direction forms a third inclined surface connected to the main surface and the first inclined surface, and a fourth inclined surface connected to the main surface and the second inclined surface, the third inclined surface is inclined with respect to the main surface and the first inclined surface and the fourth inclined surface is inclined with respect to the main surface and the second inclined surface.

2. The thermal print head of claim 1, wherein an area of the third inclined surface is less than an area of the first inclined surface, and an area of the fourth inclined surface is less than an area of the second inclined surface.

3. The thermal print head of claim 2, wherein the first inclined surface and the second inclined surface become closer to each other toward the top surface from the main surface, and the third inclined surface and the fourth inclined surface become closer to each other toward the top surface from the main surface.

4. The thermal print head of claim 3, wherein the first inclined surface and the second inclined surface are connected to the top surface and inclined with respect to the top surface, and the third inclined surface and the fourth inclined surface are connected to the top surface and inclined with respect to the top surface.

5. The thermal print head of claim 4, wherein a peripheral edge of the top surface includes:

a first edge, forming a boundary with the first inclined surface;

a second edge, forming a boundary with the second inclined surface;

a third edge, forming a boundary with the third inclined surface; and a fourth edge, forming a boundary with the fourth inclined surface, wherein the third edge is inclined with respect to the first edge in the main scanning direction, and the fourth edge is inclined with respect to the second edge in the main scanning direction.

6. The thermal print head of claim 5, wherein the third edge and the fourth edge become closer to each other when being separated from the first edge and the second edge in the main scanning direction.

7. The thermal print head of claim 5, wherein the third inclined surface and the fourth inclined surface are connected to each other in the sub-scanning direction.

8. The thermal print head of claim 4, wherein the third inclined surface and the fourth inclined surface are connected to each other in the sub-scanning direction.

9. The thermal print head of claim 3, wherein the convex portion is connected to the top surface, and including a fifth inclined surface and a sixth inclined surface inclined with respect to the main surface and the top surface, and wherein the fifth inclined surface is located on a side where the first inclined surface is located in the sub-scanning direction, the sixth inclined surface is located on a side where the second inclined surface is located in the sub-scanning direction, the fifth inclined surface and the sixth inclined surface become closer to each other toward the top surface from the main surface, an inclination angle of the fifth inclined surface with respect to the main surface is less than an inclination angle of the first inclined surface with respect to the main surface, and an inclination angle of the sixth inclined surface with respect to the main surface is less than an inclination angle of the second inclined surface with respect to the main surface.

10. The thermal print head of claim 3, wherein the third inclined surface and the fourth inclined surface are connected to each other in the sub-scanning direction.

11. The thermal print head of claim 10, wherein a ridge line forming a boundary between the third inclined surface and the fourth inclined surface is inclined with respect to the main surface.

12. The thermal print head of claim 11, wherein the ridge line is located outside the main scanning direction with respect to the top surface from a view along the thickness direction.

13. The thermal print head of claim 3, wherein a surface roughness of the third inclined surface is greater than a surface roughness of the first inclined surface, and a surface roughness of the fourth inclined surface is greater than a surface roughness of the second inclined surface.

14. The thermal print head of claim 1, further comprising an insulating layer covering the main surface and the convex portion, wherein the insulating layer is disposed between the substrate and the resistor layer.

15. The thermal print head of claim 1, wherein the wiring layer includes a common wire and a plurality of individual wires, the common wire is conducted to the plurality of heat generating portions, and the plurality of individual wires are individually conducted to the plurality of heat generating portions.

16. The thermal print head of claim 1, further comprising a protective layer covering the plurality of heat generating portions and the wiring layer.

17. The thermal print head of claim 1, further comprising a heat dissipation member, wherein the substrate has a back surface facing away from the main surface in the thickness direction, and the back surface is joined to the heat dissipation member.

18. A method of fabricating a thermal print head, comprising:

forming a mask layer on a first surface and a second surface of a substrate made of a semiconductor material, wherein the first surface and the second surface face opposite sides of each other in a thickness direction;

forming a main surface and a convex portion on the substrate by an anisotropic etching, wherein the main surface faces same direction as the first surface in the thickness direction and located between the first surface and the second surface, and the convex portion protrudes from the main surface;

removing the mask layer;

forming a resistor layer including a plurality of heat generating portions arranged in a main scanning direction and on the convex portion; and forming a wiring layer conducting the plurality of heat generating portions and in contact with the resistor layer, wherein the mask layer includes a first mask layer formed on the first surface and a second mask layer formed on the second surface, the first mask layer includes:

a covering portion, extending in the main scanning direction and covering the first surface;

two first openings, located in the sub-scanning direction with the covering portion disposed in between, and extending in the main scanning direction; and a second opening, located next to an end of the covering portion in the main scanning direction, and connected to the two first openings, and wherein the first surface is exposed from the two first openings and the second opening.

19. The method of claim 18, wherein the first mask layer is more easily dissolved in an etching solution used for the anisotropic etching than the second mask layer.

20. The method of claim 19, wherein the first mask layer is formed by plasma chemical vapor deposition (CVD), and the second mask layer is formed by low pressure CVD (LPCVD).

* * * * *